United States Patent
Yamamoto et al.

[11] Patent Number: 6,028,873
[45] Date of Patent: Feb. 22, 2000

[54] OPTICAL DEVICE CAPABLE OF FUNCTIONING WITHOUT A POPULATION INVERSION

[75] Inventors: Kazushige Yamamoto; Kouichi Ichimura; Nobuhiro Gemma, all of Yokohama, Japan

[73] Assignee: Kabushiki Kaisha Toshiba, Kawasaki, Japan

[21] Appl. No.: 08/931,846

[22] Filed: Sep. 16, 1997

[30] Foreign Application Priority Data

Sep. 17, 1996 [JP] Japan .................................. 8-245365

[51] Int. Cl.[7] ...................................................... H01S 3/14
[52] U.S. Cl. ................................................ 372/39; 372/41
[58] Field of Search ..................................... 372/39, 41, 42

[56] References Cited

U.S. PATENT DOCUMENTS

| | | | |
|---|---|---|---|
| 5,256,849 | 10/1993 | Scully .................................. | 350/96.18 |
| 5,448,582 | 9/1995 | Lawandy .................................... | 372/42 |
| 5,699,374 | 12/1997 | Ichimura et al. ......................... | 372/39 |

OTHER PUBLICATIONS

K.–J. Boller et al., "Observation of Electromagnetically Induced Transparency", Physical Review Letters, vol. 66, No. 20, pp. 2593–2596, May 20, 1991.

H.R. Gray et al., "Coherent trapping of atomic populations", Optics Letters, vol. 3, No. 6, pp. 218–220, Dec. 1978.

G. Alzetta et al., "An Experimental Method for the Observations of R.F. Transitions and Laser Beat Resonances in Oriented Na Vapor.",IL Nuovo Cimento, vol. 36 B, No. 1, pp. 5–20, Nov. 11, 1996.

E. Arimondo et al., "Nonabsorbing Atomic Coherences by Coherent Two–Photon Transitions in a Three–Level Optical Pumping.", Lettere Al Nuovo Cimento, vol. 17, No. 10, pp. 333–338, Nov. 6, 1976.

Marlan O. Scully, "Enhancement of the Index of Refraction via Quantum Coherence", Physical Review Letters, vol. 67, No. 14, pp. 1855–1858, Sep. 30, 1991.

S.E. Harris, "Lasers without Inversion: Interference of Lifetime–Broadened Resonances", Physical Review Letters, vol. 62, No. 9, pp. 1033–1036, Feb. 27, 1989.

Satoru Adachi et al., "Experimental and numerical studies on population trapping in Gd vapor", Optics Communications, vol. 81, No. 6, pp. 364–368, Mar. 15, 1991.

A.M. Akulshin et al., "Sub–natural absorption resonances on the $D_1$ line of rubidium induced by coherent population trapping", Optics Communiations, vol. 84, No. 3,4, pp. 139–143, Jul. 15, 1991.

Yong–qing Li et al., "Observation of an electromagnetically induced change of absorption in multilevel rubidium atoms", Physical Review A, vol. 51, No. 3, pp. R1754–R1757, Mar. 1995.

(List continued on next page.)

Primary Examiner—Leon Scott, Jr.
Attorney, Agent, or Firm—Finnegan, Henderson, Farabow, Garrett & Dunner, L.L.P.

[57] ABSTRACT

Two mirrors comprising a resonator, arranged facing to each other interpose an EIT layer, which is a solid containing an impurity. A controlling light from a controlling light source and a pumping light from a pumping light source enter the EIT layer. A photodiode detects the intensity of an LWI laser light (a signal light outputted from the EIT layer) outputted from one of the mirrors. A filter for cutting the controlling light is provided between the photodiode and the mirror. Two kinds of lights, that is, the controlling light and the pumping light are used in all the Λ, V, Ξ type three levels. In the Λ type three levels, the controlling light is used for supposedly exciting between the levels, and the pumping light is used for pumping electrons from the level to the level via the level. In the V type three levels, the controlling light is used for exciting between the levels, and the pumping light is used for pumping electrons from the level to the level via the level. In the Ξ type three levels, the controlling light is used for supposedly exciting between the levels, and the pumping light is used for pumping electrons from the level to the level via the level.

18 Claims, 15 Drawing Sheets

OTHER PUBLICATIONS

P.J. Harshman et al, "Strong Field Theory of Low Loss Optical Switching and Three–Wave Mixing in a Semiconductor Quantum Well", IEEE Journal of Quantum Electronics, vol. 30, No. 10, pp. 2297–2303, Oct. 10, 1994.

Yifu Zhu et al., "Intensity characteristics of inversionless lasers from induced atomic coherence",, Physical Review A, vol. 49, No. 5, pp. 4016–4023, May 1994.

Danhong Huang et al., "Coulomb and light–induced electronic normalization in quantum well for electromagnetically induced transparency and light amplification without inversion", J. Opt. Soc. Am. B, vol. 11, No. 11, pp. 2258–2265, Nov. 1994.

Matti Kaivola et al., "Observation of Population Trapping in a Two–Photon Resonant Three–Level Atom", Optics Communications, vol. 49, No. 6, pp. 418–422, Apr. 15, 1984.

A. Kasapi et al., "Electromagnetically Induced Transparency: Propagation Dynamics", Physical Review Letters, vol. 74, No. 13, pp. 2447–2450, Mar. 27, 1995.

A. Imamoglu et al., "Semiconductor lasers without population inversion", Optics Letters, vol. 19, No. 21, pp. 1744–1746, Nov. 1, 1994.

A.S. Zibrov et al., "Experimental Demonstration of Laser Oscillation without Population Inversion via Quantum Interference in Rb", Physical Review Letters, vol. 75, No. 8, pp. 1499–1502, Aug. 21, 1995.

A. Aspect et al. "Laser Cooling below the One–Photon Recoil Energy by Velocity–Selective Coherent Population Trapping", Physical Review Letters, vol. 61, No. 7, pp. 826–829, Aug. 15, 1988.

Changjiang Wei et al., "Experimental investigations of absorption and dispersion profiles of a strongly driven transition V–shaped three–level system with a strong probe", Physical Review A, vol. 51, No. 2, pp. 1438–1445, Feb. 1995.

OPTICAL DEVICE CAPABLE OF FUNCTIONING WITHOUT A POPULATION INVERSION

BACKGROUND OF THE INVENTION

The present invention relates to a function element, such as an LWI (lasing without inversion) laser element, capable of functioning without a population inversion based on the EIT (electro-magnetically induced transparency) in a medium such as a solid.

The entire contents of Japanese Patent Application No. 8-245365 filed on Sep. 17, 1996 are incorporated herein by reference.

Recently, studies are actively conducted for realizing the EIT by utilizing a semiconductor quantum well having comparatively discrete energy levels among various solids, and an impurity (such as A. Imamoglu et al., Opt. Lett. 19, 1744 (1994); P. J. Harshman et al., IEEE j. Quantum Electronics 30, 2297 (1994); D. Huang et al., J. Opt. Soc. Am. B11, 2297 (1994); Y. Zhu et al., Phys. Rev. A49, 4016 (1994)).

However, a significant EIT characteristic as shown in an atom gas has not been observed in a solid. The reason is that a quantum structure cannot be formed homogeneously in a semiconductor quantum well with the conventional element production technology so that energy levels vary widely.

Due to the inhomogeneously broadened energy levels, the number of the quantum structures satisfying the EIT condition on detuning; $\Delta\omega_1=\Delta\omega_2$ ($\Lambda$ type and V type excitation), or $\Delta\omega_1=-\Delta\omega_2$ ($\Xi$ type excitation) decreases, the EIT characteristics of the optical transition are small with respect to the atom gases. Therefore, large light modulation characteristics derived from the EIT, which are indispensable for an optical element, such as an LWI laser, have not been obtained in a semiconductor quantum well.

On the other hand, since transition with very little variation in the energy levels exist in the case of impurities, in particular, rare-earth ions or transition metal ions, the EIT conditions of detuning can be satisfied comparatively easily by the selection of such a transition.

However, the transition probability of the f—f transition of a rare-earth ion or the d—d transition of the transition metal ion is extremely small even if it is the allowed transition (the oscillator strength of a rare-earth ion or a transition metal ion is about $10^{-5}$ with respect to that of an usual allowed transition of ~1).

Besides, the oscillator strength of such as forbidden transition of an impurity cannot be the ideal value, zero, but it is known that a transition having a value of about $10^{-5}$ to $10^{-8}$ exists.

Therefore, since it is difficult to have the contrast in the transition probability between the allowed transition and the forbidden transition, furthermore, the relaxation rates thereof do not vary widely, even if $\Lambda$ type three levels are set by the impurity energy level, it is difficult to satisfy the EIT conditions. Accordingly, large light modulation characteristics derived from the EIT have not been obtained in an impurity in a solid as in the semi-conductor quantum well.

As mentioned above, a function element such as an LWI laser based on the EIT utilizing a solid, and a light modulation element has a problem in that the transition probability and the relaxation rate of a solid do not coincide with the EIT conditions to disturb the realization thereof.

BRIEF SUMMARY OF THE INVENTION

An object of the present invention is to provide a function element based on the EIT, utilizing a medium such as a solid.

According to an aspect of the present invention, there is provided a function element comprising: a medium containing an impurity; an exciting means for allowing a first coherent light having a wavelength corresponding to an energy difference between a first level and a second level and a second coherent light having a wavelength corresponding to an energy difference between the first level and a third level, to exist in the medium, the first, second and third levels being included in energy levels of the impurity, and can be put in the descending order of the first level, the second level, and the third level with respect to an energy level; and a resonator having a pair of mirrors arranged so as to interpose the medium, wherein a first optical transition between the first level and the second level, and a second optical transition between the first level and the third level are in phase with a resonance mode of the resonator, a transition probability of the first optical transition is higher than the transition probability of the first optical transition in the case without the resonator, a transition probability of the second optical transition is higher than the transition probability of the second optical transition in the case without the resonator, a third optical transition between the second level and the third level is out of phase with the resonance mode of the resonator, and a transition probability of the third optical transition is lower than the transition probability of the third optical transition in the case without the resonator.

According to a second aspect of the present invention, there is provided a function element comprising: a medium containing an impurity; an exciting means for allowing a first coherent light having a wavelength corresponding to the energy difference between a first level and a third level and a second coherent light having a wavelength corresponding to the energy difference between the second level and a third level, to exist in the medium, the first, second and third levels being included in energy levels of the impurity, and can be put in the descending order of the first level, the second level, and the third level with respect to an energy level; and a resonator having a pair of mirrors arranged so as to interpose the medium, wherein a first optical transition between the first level and the third level, and a second optical transition between the second level and the third level are in phase with the resonance mode of the resonator, a transition probability of the first optical transition is higher than the transition probability of the first optical transition in the case without the resonator, a transition probability of the second optical transition is higher than the transition probability of the second optical transition in the case without the resonator, and a third optical transition between the first level and the third level is out of phase with the resonance mode of the resonator, and a transition probability of the third optical transition is lower than the transition probability of the third optical transition in the case without the resonator.

According to a third aspect of the present invention, there is provided a function element comprising: a medium containing an impurity; an exciting means for allowing a first coherent light having a wavelength corresponding to the energy difference between a first level and a second level and a second coherent light having a wavelength corresponding to the energy difference between the second level and a third level, to exist in the medium, the first, second and third levels being included in energy levels of the impurity, and can be put in the descending order of the first level, the second level, and the third level with respect to an energy level; and a resonator having a pair of mirrors arranged so as to interpose the medium, wherein a first optical transition between the first level and the second level, and a second optical transition between the second level and the third level are in phase with the resonance mode of the resonator, a transition probability of the first optical transition is higher than the transition probability of the first optical transition in the case without the resonator, a transition probability of the second optical transition is higher than the transition probability of the second optical transition in the case without the resonator, a third optical transition between the first level and the third level is out of phase with the resonance mode of the resonator, and a transition probability of the third optical transition is lower than the transition probability of the third optical transition in the case without the resonator.

In this invention, the system is arranged so that the energy between the levels coupled by light can coincide with the resonance mode of a resonator, and the levels not coupled by light can be out of the resonance mode even in the case values of the transition probability of the optical transition of the impurity or the relaxation rate in the medium do not coincide with the EIT conditions. Accordingly, the EIT can be induced in substantially all impurities to realize a practical function element such as an LWI laser based on the EIT in a medium such as a solid.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1A:
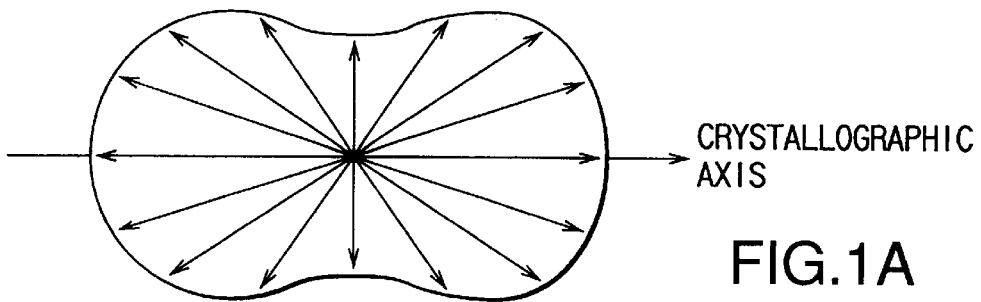
FIGS. 1A and 1B are diagrams qualitatively showing the spatial intensity distribution of the transition probability of an impurity with respect to the crystallographic axis in a solid.

The basic principle of the present invention will be described.

In the present invention, a medium denotes a system where the EIT can be induced, excluding an atom gas system, such as a solid or a liquid. Hereinafter the case of using a solid as the medium will be explained, but the same can be applied to the case of a liquid.

In the present invention, the sizes of the transition probability of the optical transition for each of three electronic transitions with three impurity levels in a solid are defined while comparing the case with a resonator and the case without a resonator.

The basic principle of the transition probability control by a resonator in an electronic system in a substance is changing the mode of the radiation field for interchanging photons with the substance. The EIT controls the transition probability by changing the value of the electric dipole moment utilizing the interference effect between two optical transitions whereas the resonator controls the transition probability by utilizing the density being varied in the mode of the radiation field allowed in the resonator compared with the case in a vacuum without changing the value of the dipole moment itself.

Conventionally, the transition probability of the optical transition in a substance, such as the spontaneous emission rate of excited atoms placed in a vacuum has been considered to be a constant inherent to the atoms. However, recent progress in the quantum electrodynamics of the radiation field revealed that the spontaneous emission is not the property of the substance in the vacuum, but the property of a system formed by coupling of the substance and the vacuum field. Hereinafter the control principle of the transition probability by a resonator will be explained.

A circumstance where electrons emit photons when they transit from the excited-state |e> to the ground state |g> in a substance placed in a vacuum will be considered.

In this case, the transition probability $W_e$ of emitting photons of a single mode in a volume V will be described below using the Fermi's golden rule.

$$We = (8\pi^3/h^2)|<g, s+1|H_{int}|e, s>|^2 \rho \quad (1)$$

Herein $H_{int}$ represents the interaction Hamiltonian, s represents the number of photons of a single mode, $\rho$ represents the density of the mode per a unit frequency, and h represents the Planck's constant.

The matrix elements of the transition are described as below.

$$|<g, s+1|H_{int}|e, s>|^2 = (\mu^2 h \, \omega/4\pi\epsilon_0 V)^{1/2}(s+1) \quad (2)$$

Herein $\mu$ represents the electric dipole moment of the transition, and $\omega$ represents the angular frequency of a light. By substituting them for the above-mentioned formula (1), $$We = (2\pi\mu/h)^2(h \, \omega/2\epsilon_0 V)s\rho + (2\pi\mu/h)^2(h\omega/2\epsilon_0 V)\rho \quad (3)$$

is obtained.

As can be seen by the first term of the formula (3) being proportional to s, it represents the transition probability by the stimulated emission, and the second term represents the transition probability of the spontaneous emission.

In a vacuum, the density of the radiation mode in a vacuum field for accepting photons emitted from a substance exists close to infinity.

In the case a substance is placed in a resonator, the density of the radiation mode drastically changes, and as a consequence, the coupling style between the substance and the vacuum field is drastically changed.

In general, compared with the case in a vacuum, the density of the mode in a resonator increases greatly in the resonance angular frequency area, and decreases greatly out of the resonance angular frequency area.

Therefore, the transition probability of a substance can be significantly reinforced by having the resonance angular frequency of the resonator in phase with the transition energy of the substance, on the other hand, can be significantly restrained by having it out of phase.

Although the above-mentioned discussion is made on the transition probability of emission, but the same can be applied to the transition probability of absorption.

A system to be the subject herein basically comprises three levels and two coherent lights 1, 2. Three schemes exist for the combination of the levels 1, 2 and the lights. The excitation with the two excited lights 1, 2 with the uppermost level 1 as the common level is defined to be the Λ type excitation. The excitation with the ground state 3 as the common level is defined to be the V type excitation. And the excitation with the middle level 2 as the common level is defined to be the Ξ type excitation.

Accordingly, the conditions on the above-mentioned transition probability are realized in the present invention by having transitions between the levels 1 and 2 and between the levels 1 and 3 in phase with the resonance mode of the resonator, but having the transition between the levels 2 and 3 out of phase in the Λ type excitation, having transitions between the levels 1 and 3 and between the levels 2 and 3 in phase with the resonance mode of the resonator, but having the transition between the levels 1 and 2 out of phase in the V type excitation, and having transitions between the levels 1 and 2 and between the levels 2 and 3 in phase with the resonance mode of the resonator, but having the transition between the levels 1 and 3 out of phase in the Ξ type excitation. The level 1, the level 2, the level 3 correspond with descending order with respect to height of the energy level.

When the solid containing an impurity is a crystal, in the case both the optical transitions of the two impurities coupled by a coherent light are the σ transition, or the π transition, the geometrical position relationship of the crystal with respect to the resonator axis can be defined. With such a resonator configuration, the optical transitions of the two impurities coupled by a coherent light can be selectively coupled with the resonance mode of the resonator strongly for the following reason.

Figure 1B:
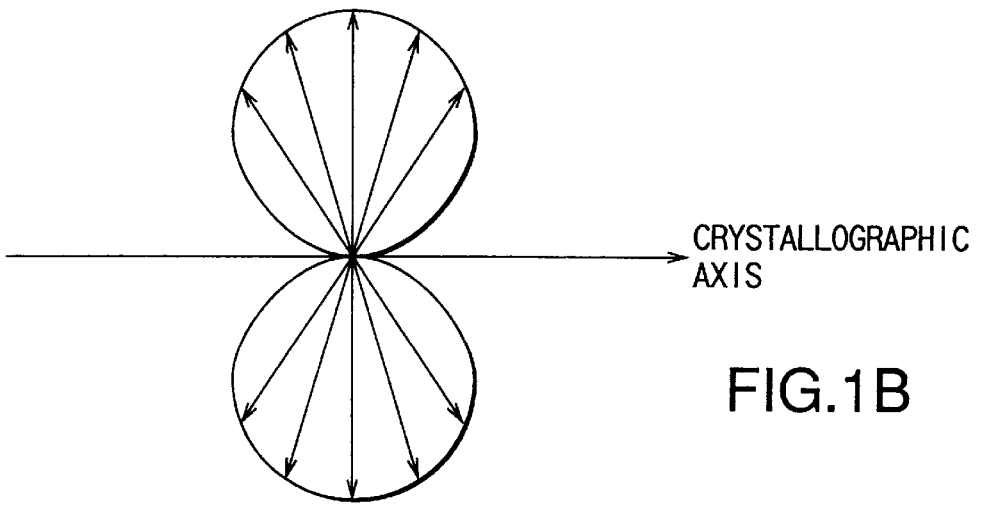

FIGS. 1A and 1B schematically show the crystallographic axis in a solid and the transition probability of the optical transition of an impurity (intensity of the absorption and the fluorescence). FIG. 1A is the case when the optical transition of the impurity is the σ transition with respect to the crystallographic axis, and FIG. 1B is the case when it is the π transition.

In the case of the σ transition shown in FIG. 1A, the electric dipole moment induced in the impurity by the optical excitation is perpendicular to the crystallographic axis. Therefore, the optical transition is strongly polarized along the crystallographic axis so that the transition probability becomes maximum in the direction parallel to the crystallographic axis.

On the other hand, in the case of the π transition shown in FIG. 1B, the direction of the induced dipole moment is parallel to the crystallographic axis. Therefore, the optical transition is strongly polarized in directions excluding the direction of the crystallographic axis so that the transition probability becomes maximum in the direction perpendicular to the crystallographic axis.

Figure 2A:
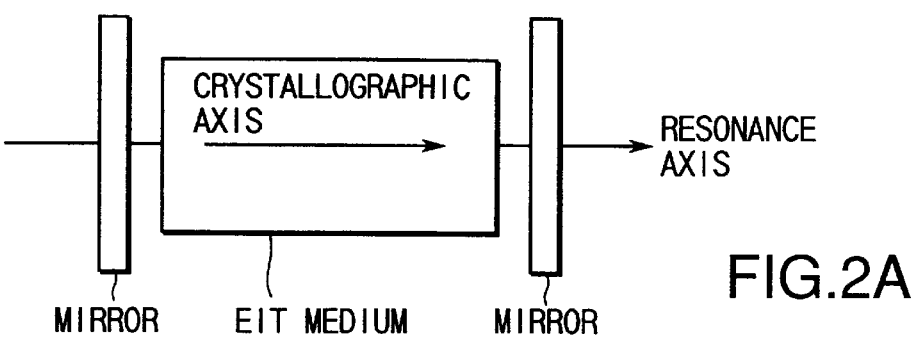
FIGS. 2A and 2B are diagrams qualitatively showing the geometrical position relationship of an EIT crystal in a resonator.
Figure 2B:
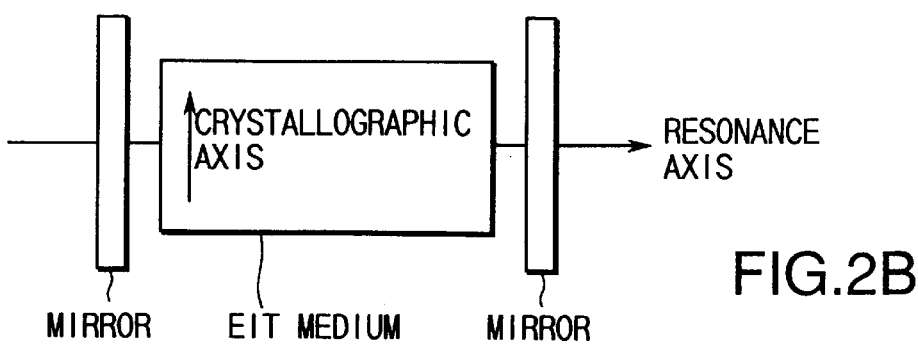

Accordingly, the optical transition can be induced most efficiently along the resonator axis by arranging the crystallographic axis parallel to the axis perpendicular to the mirror surfaces of the resonator (resonator axis) in the case the both optical transitions of two impurities are the σ transition as shown in FIG. 2A, and arranging the crystallographic axis perpendicular to the resonator axis in the case the both of the two optical transitions are the π transition as shown in FIG. 2B.

In the case the angular frequency of a light propagating on the resonator axis is in phase with the resonance mode of the resonator, since the two optical transitions and the resonance mode of the resonator couple strongly to each other, the transition probability is significantly reinforced in the two optical transitions as mentioned above.

Accordingly, the conditions on the transition probability of the Λ type excitation with a crystal as the solid containing an impurity can be realized by arranging the crystal so that the transition probability becomes maximum in the direction parallel to the resonator axis (in other words, in the direction perpendicular to the mirror surfaces) in the case the optical transitions of both between the levels 1 and 2 and between the levels 1 and 3 are the σ transition, and arranging the crystal so that the transition probability becomes minimum in the direction perpendicular to the resonator axis (in other words, in the direction parallel to the mirror surfaces) in the case the optical transitions are the π transition.

The conditions on the transition probability of the V type excitation with a crystal as the solid containing an impurity can be realized by arranging the crystal so that the transition probability becomes maximum in the direction parallel to the resonator axis (in other words, in the direction perpendicular to the mirror surfaces) in the case the optical transitions of both between the levels 1 and 3 and between the levels 2 and 3 are the σ transition, and arranging the crystal so that the transition probability becomes minimum in the direction perpendicular to the resonator axis (in other words, in the direction parallel to the mirror surfaces) in the case the optical transitions are the π transition.

The conditions on the transition probability of the Ξ type excitation with a crystal as the solid containing an impurity can be realized by arranging the crystal so that the transition probability becomes maximum in the direction parallel to the resonator axis (in other words, in the direction perpendicular to the mirror surfaces) in the case the optical transitions of both between the levels 1 and 2 and between the levels 2 and 3 are the σ transition, and arranging the crystal so that the transition probability becomes minimum in the direction perpendicular to the resonator axis (in other words, in the direction parallel to the mirror surfaces) in the case the optical transitions are the π transition.

As a method for setting three levels so that both the optical transitions of two impurities become the σ transition or the π transition for impurities in a solid material later described, it is possible to predict from the symmetry of each energy level of the impurities with respect to the crystal field.

In general, the energy level of a rare-earth impurity or a transition metal impurity dispersed in a solid depends upon the microscopic electric field environment (crystal field), which is completely different from the case of a free atom or an ion.

The quantum state of the energy level characterized by the crystal field is known to be expressed by the irreducible representation of the point group (irreducible representation of the symmetry) where the crystal field belongs to. Since the selection rule of the optical transitions is defined univocally based on the irreducible representation of the symmetry with respect to the crystal field, whether the type of the optical transition is the σ transition or the π transition is also defined univocally from the irreducible representation.

Therefore, by selecting materials having equivalent irreducible representation in the symmetrical property with respect to the crystal field for the levels 2 and 3, the type of the both optical transitions between the levels 1 and 2, and between the levels 1 and 3 can be the σ transition or the π transition so that the conditions on the transition probability of the Λ type excitation can be satisfied.

Similarly, the conditions on the transition probability can be satisfied by selecting materials having equivalent irreducible representation in the symmetry property with respect to the crystal field for the levels 1 and 2 in the V type excitation, and by selecting materials having equivalent irreducible representation in the symmetry property with respect to the crystal field for the levels 1 and 3 in the Ξ type excitation.

In the Λ type excitation, when the refractive indices of the solid containing an impurity are $n_{12}$, $n_{13}$, $n_{23}$ at angular frequencies $\omega_{12}$, $\omega_{13}$, $\omega_{23}$ corresponding to the individual energy differences of the impurity between the levels 1 and 2, between the levels 1 and 3, and between the levels 2 and 3, either of the ratios of the refractive indices $(n_{23}/n_{12})$, $(n_{23}/n_{13})$ is defined not to be an integer for the following reason.

With the premise that the refractive indices of the solid material containing an impurity are $n_{12}=n_{13}=n_{23}=n_0$, a circumstance where the optical transitions of the impurity between the levels 1 and 2, and between the levels 1 and 3 are in phase with the resonance mode of the resonator and the optical transition of the impurity between the levels 2 and 3 is out of phase with the resonance mode as in the first aspect of the present invention will be supposed. With the resonator mirrors directly in contact with the solid material, the angular frequencies $\omega_{12}$, $\omega_{13}$ corresponding to the inter-level energies between the levels 1 and 2 and between the levels 1 and 3 are connected with the resonator length L as follows.

$$L=\alpha(\pi c/n_0\omega_{12}) \tag{4a}$$

$$L=\beta(\pi c/n_0\omega_{13}) \tag{4b}$$

(where, β>α)

Herein c represents the velocity of light.

Since the both optical transitions between the levels 1 and 2 and between the levels 1 and 3 are in phase with the resonance mode of the resonator from the above-mentioned conditions, both α and β in the formulae (4) are a positive integer.

For the relationship between the angular frequency $\omega_{23}$ corresponding to the inter-level energy between the levels 2 and 3 and L is defined by:

$$L=\gamma(\pi c/n_0\omega_{23}) \tag{5}$$

By substituting the formulae (4a), (4b), (5) in the relational expression of the inter-level energy; $\omega_{12}+\omega_{23}=\omega_{13}$, γ in the formula (5) can be described with α, β as:

$$\gamma=\beta-\alpha \tag{6}$$

From the formula (6), it is learned that γ is also a positive integer. That means, in the case the refractive indices at each angular frequency of the solid material $n_{12}$, $n_{13}$, $n_{23}$ are equal, by having both the optical transitions between the levels 1 and 2 and between the levels 1 and 3 in phase with the resonance mode of the resonator, the optical transition between the levels 2 and 3 inevitably is in phase with the resonance mode.

With the premise that the refractive indices of the solid material are $n_{12}\neq n_{13}$, $n_{12}\neq n_{23}$, $n_{13}\neq n_{23}$, a circumstance where the optical transitions of the impurity between the levels 1 and 2 and between the levels 1 and 3 are in phase with the resonance mode of the resonator and the optical transition of the impurity between the levels 2 and 3 is out of phase with the resonance mode will be supposed.

With the same resonator configuration and resonator length as above, the angular frequencies $\omega_{12}$, $\omega_{13}$ are connected with the resonator length L as follows.

$$L=\zeta(\pi c/n_{12}\omega_{12}) \tag{7a}$$

$$L=\eta(\pi c/n_{13}\omega_{13}) \tag{7b}$$

(where η>ζ)

Here, both η and ζ in the formulae (7) are a positive integer. For the relationship between the angular frequency $\omega_{23}$ corresponding to the inter-level energy between the levels 2 and 3 and L is defined by:

$$L=\xi(\pi c/n_{23}\omega_{23}) \tag{8}$$

Similarly, ξ can be described with ζ and η as:

$$\xi=\eta(n_{23}/n_{13})-\zeta(n_{23}/n_{12}) \tag{9}$$

The formula (9) indicates in the case either of the two coefficients $(n_{23}/n_{12})$, $(n_{23}/n_{13})$ is not an integer, ξ is not an integer so that only the optical transition between the levels 2 and 3 can be out of phase with the resonance mode.

As heretofore mentioned, by selecting materials so that the refractive indices of the solid material $(n_{23}/n_{12})$, $(n_{23}/n_{13})$ are not an integer, the conditions on the transition probability of the Λ type, V type, and Ξ type excitations can be realized.

Examples of solid materials satisfying the above-mentioned conditions include those containing at least one kind of impurities such as primary transition metal elements including Ti, V, Cr, Mn, Fe, Co, Ni, and Cu, secondary transition metal elements including Zr, Nb, Mo, Tc, Ru, Rh, Pd, and Ag, tertiary transition metal elements including Hf, Ta, W, Re, Os, Ir, Pt, and Au, lanthanoid type rare-earth elements including Ce, Pr, Nd, Sm, Eu, Gd, Tb, Dy, Ho, Er, Tm, and Yb, and an actinoid type rare-earth elements including Th, Pa, and U, LiF, NaF, KF, RbF, CsF, $MgF_2$, $CaF_2$, $SrF_2$, $BaF_2$, $MnF_2$, $ZnF_2$, $CdF_2$, $AlF_3$, $YF_3$, $LaF_3$, $CeF_3$, $PrF_3$, $NdF_3$, $SmF_3$, $EuF_3$, $GdF_3$, $TbF_3$, $DyF_3$, $HoF_3$, $ErF_3$, $TmF_3$, $YbF_3$, $LuF_3$, $LiBaF_3$, $KMgF_3$, $KMnF_3$, $KZnF_3$, $KNiF_3$, $RbNiF_3$, $ZrF_4$, $LiYF_4$, $NaYF_4$, $KYF_4$, $LiLaF_4$, $LiGdF_4$, $LiLuF_4$, $BaAlF_5$, $SrAlF_5$, $K_3YF_6$, $K_3CoF_6$, $Cs_3NdF_7$, $Cs_3GdF_7$, LiCl, NaCl, KCl, RbCl, CsCl, $YCl_3$, $LaCl_3$, $CeCl_3$, $PrCl_3$, $NdCl_3$, $SmCl_3$, $EuCl_3$, $GdCl_3$, $TbCl_3$, $DyCl_3$, $HoCl_3$, $ErCl_3$, $TmCl_3$, $YbCl_3$, $LuCl_3$, $CsMgCl_3$, $CsCdCl_3$, LiBr, NaBr, KBr, RbBr, CsBr, $YBr_3$, $LaBr_3$, $CeBr_3$, $PrBr_3$, $NdBr_3$, $SmBr_3$, $EuBr_3$, $GdBr_3$, $TbBr_3$, $DyBr_3$, $HoBr_3$, $ErBr_3$, $TmBr_3$, $YbBr_3$, $LuBr_3$, $CsMgBr_3$, LiI, NaI, KI, RbI, CsI, CuCl, CuBr, CuI, AgF, AgCl, AgBr, AgI, YOCl, LaOCl, LaOBr, TlCl, TlBr, TlI, InBr, InI, $Li_2O$, BeO, $N_2O_5$, $Na_2O$, $P_2O_3$, $S_2O_3$, $K_2O$, CaO, $Cr_2O_3$, $MnO_2$, CoO, NiO, SrO, $ZrO_2$, $Nb_2O_5$, $MoO_3$, AgO, $Sb_2O_3$, $TeO_2$, BaO, $WO_3$, $Re_2O_7$, PbO, $PuO_2$, $Y_2O_3$, $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, $ThO_2$, $UO_2$, $UO_3$, $Ba_2GdNbO_5$, $SrGdGa_3O_7$, $Sc_2Gd_3Ga_3O_{12}$, $NaLuO_{12}$, $LiIO_3$, $LiNbO_3$, $LiTaO_3$, $Ba_2NaNb_5O_{15}$, $Y_2O_2S$, $La_2O_2S$, $Ce_2O_2S$, $Pr_2O_2S$, $Nd_2O_2S$, $Sm_2O_2S$, $Eu_2O_2S$, $Gd_2O_2S$, $Tb_2O_2S$, $Dy_2O_2S$, $Ho_2O_2S$, $Er_2O_2S$, $Tm_2O_2S$, $Yb_2O_2S$, $Lu_2O_2S$, $Y_2S_3$, $La_2S_3$, $Ce_2S_3$, $Pr_2S_3$, $Nd_2S_3$, $Sm_2S_3$, $Eu_2S_3$, $Gd_2S_3$, $Tb_2S_3$, $DY_2S_3$, $Ho_2S_3$, $Tm_2S_3$, $Yb_2S_3$, $Lu_2S_3$, $B_2O_3$, $GaBO_3$, $InBO_3$, $TlBO_3$, $ScBO_3$, $YBO_3$, $LaBO_3$, $CeBO_3$, $PrBO_3$, $NdBO_3$, $SmBO_3$, $EuBO_3$, $GdBO_3$, $TbBO_3$, $DyBO_3$, $HoBO_3$, $ErBO_3$, $TmBO_3$, $YbBO_3$, $LuBO_3$, $CaYBO_4$, $BaB_2O_4$, $Cd_2B_2O_5$, $LiB_3O_5$, $CsB_3O_5$, $SrB_4O_7$, $Al_3TbB_4O_{12}$, ZnO, $ZnGa_2O_4$, MgO, $MgGa_2O_4$, $Mg_2TiO_4$, $Mg_4Ta_2O_9$, $TiO_2$, $CaTiO_3$, $SrTiO_3$, $BaTiO_3$, $PbTiO_3$, $KTiPO_5$, $Al_2O_3$, $LiAlO_2$, $YAlO_3$, $BeAl_2O_4$, $MgAl_2O_4$, $ZnAl_2O_4$, $LiAl_5O_8$, $Y_4Al_2O_9$, $YAl_3B_4O_{12}$, $Y_3Al_5O_{12}$, $La_3Al_5O_{12}$, $Ce_5Al_5O_{12}$, $Pr_3Al_5O_{12}$, $Nd_3Al_5O_{12}$, $Sm_3Al_5O_{12}$, $Eu_3Al_5O_{12}$, $Gd_3Al_5O_{12}$, $Tb_3Al_5O_{12}$, $Dy_3Al_5O_{12}$, $Ho_3Al_5O_{12}$, $Er_3Al_5O_{12}$, $Tm_3Al_5O_{12}$, $Yb_3Al_5O_{12}$, $Lu_3Al_5O_{12}$, $LaAl_{11}O_{18}$, $CeMgAl_{11}O_{19}$, $TbMgAl_{11}O_{19}$, $BaAl_{12}O_{19}$, $BaMg_2Al_{16}O_{27}$, $Fe_2O_3$, $Y_3Fe_5O_{12}$, $La_3Fe_5O_{12}$, $Ce_3Fe_5O_{12}$, $Pr_3Fe_5O_{12}$, $Nd_3Fe_5O_{12}$, $Sm_3Fe_5O_{12}$, $Eu_3Fe_5O_{12}$, $Gd_3Fe_5O_{12}$, $Tb_3Fe_5O_{12}$, $Dy_3Fe_5O_{12}$, $Ho_3Fe_5O_{12}$, $Er_3Fe_5O_{12}$, $Tm_3Fe_5O_{12}$, $Yb_3Fe_5O_{12}$, $Lu_3Fe_5O_{12}$, $Y_3Ga_5O_{12}$, $La_3Ga_5O_{12}$, $Ce_3Ga_5O_{12}$, $Pr_3Ga_5O_{12}$, $Nd_3Ga_5O_{12}$, $Sm_3Ga_5O_{12}$, $Eu_3Ga_5O_{12}$, $Gd_3Ga_5O_{12}$, $Tb_3Ga_5O_{12}$, $Dy_3Ga_5O_{12}$, $Ho_3Ga_5O_{12}$, $Er_3Ga_5O_{12}$, $Tm_3Ga_5O_{12}$, $Yb_3Ga_5O_{12}$, $Lu_3Ga_5O_{12}$, $Y_3Sc_2Ga_5O_{12}$, $CaPO_3$, $ScPO_4$, $YPO_4$, $LaPO_4$, $CePO_4$, $PrPO_4$, $NdPO_4$, $EuPO_4$, $GdPO_4$, $TbOP_4$, $DyPO_4$, $HoPO_4$, $ErPO_4$, $TmPO_4$, $YbPO_4$, $LuPO_4$, $Ca_2PO_4Cl$, $Mg_3(PO_4)_2$, $Ca_3(PO_4)_2$, $Sr_3(PO_4)_2$, $Ba_3(PO_4)_2$, $Zn_3(PO_4)_2$, $Cd_3(PO_4)_2$, $Mg_5(PO_4)_3F$, $Mg_5(PO_4)_3Cl$, $Ca_5(PO_4)_3F$, $Ca_5(PO_4)_3Cl$, $Sr_5(PO_4)_3F$, $Sr_5(PO_4)_3Cl$, $Ba_5(PO_4)_3F$, $Ba_5(PO_4)_3Cl$, $Sr_2P_2O_7$, $NdP_5O_{14}$, $SiO_2$, $BeSiO_3$, $MgSiO_3$, $CaSiO_3$, $SrSiO_3$, $BaSiO_3$, $ZnSiO_3$, $CdSiO_3$, $Zn_2SiO_4$, $NaYSiO_4$, $Y_2SiO_5$, $La_2SiO_5$, $Lu_2SiO_5$, $BeSi_2O_5$, $MgSi_2O_5$, $CaSi_2O_5$, $SrSi_2O_5$, $BaSi_2O_5$, $Sc_2Si_2O_7$, $Be_2SrSi_2O_7$, $Ca_2MgSi_2O_7$, $Si_3N_4$, $GeO_2$, $Zn_2GeO_4$, $Cs_2UO_2F_4$, $Cs_2UO_2Cl_4$, $Cs_2UO_2Br_4$, $Cs_3UO_2F_5$, $Cs_3UO_2Cl_5$, $Cs_3UO_2Br_5$, $MgWO_4$, $CaWO_4$, $SrWO_4$, $BaWO_4$, $AlWO_4$, $CdWO_4$, $PbWO_4$, $Y_2WO_6$, $MgMoO_4$, $CaMoO_4$, $SrMoO_4$, $BaMoO_4$, $Li_2MoO_4$, $Y_2Mo_3O_{12}$, $La_2Mo_3O_{12}$, $Ce_2Mo_3O_{12}$, $Pr_2Mo_3O_{12}$, $Nd_2Mo_3O_{12}$, $Sm_2Mo_3O_{12}$, $Eu_2Mo_3O_{12}$, $Gd_2Mo_3O_{12}$, $Tb_2Mo_3O_{12}$, $Dy_2Mo_3O_{12}$, $Ho_2Mo_3O_{12}$, $Er_2Mo_3O_{12}$, $Tm_2Mo_3O_{12}$, $Yb_2Mo_3O_{12}$, $Lu_2Mo_3O_{12}$, $NaCaVO_4$, $ScVO_4$, $YVO_4$, $Mg_3(VO_4)_2$, $Ca_3(VO_4)_2$, $Sr_3(VO_4)_2$, $Ba_3(VO_4)_2$, $Zn_3(VO_4)_2$, $Cd_3(VO_4)_2$, $Mg_5(VO_4)_3F$, $Mg_5(VO_4)_3Cl$, $Ca_5(VO_4)_3F$, $Ca_5(VO_4)_3Cl$, $Sr_5(VO_4)_3F$, $Sr_5(VO_4)_3Cl$, $Ba_5(VO_4)_3F$, $Ba_5(VO_4)_3Cl$, CaS, SrS, BaS, CaSe, BaSe; and insulating inorganic materials such as fluorides, halide, bromides, iodides, copper halide, silver halide, acid halide, thallium compounds, indium compounds, borate, zinc oxides, magnesium oxides, titanium oxides, aluminates, garnet, silicates, germanates, yttrium compounds, lanthanum compounds, cerium compounds, praseodymium compounds, neodymium compounds, samarium compounds, europium compounds, gadolinium compounds, terbium compounds, dysprosium compounds, holmium compounds, erbium compounds, thulium compounds, ytterbium compounds, luthetium compounds, urai compounds, phosphates, Scheele compounds, sulfide, and seleniums.

In addition, semiconductor or semi-insulator materials comprising at least one of the above-mentioned transition metal elements or rare-earth elements as impurity, such as diamond, Si, SiC, SiGe, Ge, GaAs, $Ga_4$, GaN, GaSb, AlAs, AlP, AlN, AlSb, InAs, InP, InSb, HgS, HgSe, HgTe, BAs, BP, BN, ZnS, ZnSe, ZnTe, CdS, CdSe, CdTe, $Cu_2O$, $SnO_2$, and $In_2O_3$ can be used as well.

In general, a transition metal element or a rare-earth element exists as an ion in the above-mentioned materials, but the valence number thereof is not particularly limited.

With an advanced semiconductor element production technology, providing the inhomogeneaus broadening of the energy levels reduced to a level equivalent to an atom gas, it is also possible to use a superlattice, quantum fine lines, or quantum dots.

As the electronic transitions excited by light in the present invention, the d→d transition concerned with the 3d level of the ion in the case a primary transition metal ion is excited, the d→d transition concerned with the 4d level of the ion in the case a secondary transition metal ion is excited, the d→d transition concerned with the 5d level of the ion in the case a tertiary transition metal ion is excited, the f→f transition or the f→d transition concerned with the 4f or 5d levels in the case a lanthanoid type rare-earth ion is excited, and the f→f transition concerned with the 5f level in the case an actinoid type rare-earth ion is excited, are used respectively.

As the light source, a coherent light, that is, a laser beam is used. Although the kind of the laser is not particularly limited as long as its wavelength meets that of the above-mentioned electronic transition, it is preferable to use a semiconductor laser, which is advantageous in forming a compact element.

According to the above-mentioned configuration, in a function element of the present invention, it is possible to obtain a laser oscillation having large light modulation characteristics without inverted population based on the quantum coherence even if values of the transition probability or the relaxation rate of the optical transitions of an impurity in a solid do not meet with the EIT conditions. Hereinafter this point will be explained with reference to drawings in detail.

The point of inducing the EIT in a rare-earth impurity or a transition metal impurity is to select a system satisfying the EIT conditions on the transition probability and the relaxation. For example, in the case of the Λ type excitation, it is required that between the levels 2 and 3 not having the light excitation is the forbidden transition (the transition probability is zero) so that the relaxation process such as spontaneous emission does not exist from the excited-state 2 to the ground state 3, that is, the excited-state 2 is a metastable state with infinite life. Therefore, in selecting the Λ type three levels in a real system, selection of the level 2 is the important point.

Similarly, in the case of the Ξ type excitation, it is required that between the levels 1 and 3 not having the light excitation is the forbidden transition so that the relaxation process such as spontaneous emission does not exist from the excited-state 1 to the ground state 3. That is, it is important to select a level so that the excited-state 1 behaves as a metastable state when viewed from the ground state 3.

In the case of the V type excitation, it is required that between the levels 1 and 2 not having the light excitation is the forbidden transition so that the relaxation process such as spontaneous emission does not exist from the excited-state 1 to the excited-state 2. That is, it is necessary to select a level so that the excited-state 1 behaves as a metastable state when viewed from the excited-state 2.

The case of inducing the EIT utilizing the energy level of a lanthanoid type rare-earth ion as an impurity will be considered. The absorption or emission of a rare-earth ion is mainly due to the 4f electrons in an imperfect shell. Since the 4f electrons are shielded by the 8 electrons in the 5S, 5P shells on the outer side, they seldom have the influence from the outside. Accordingly, the absorption or emission spectrum is observed as a sharp linear spectrum also in the crystal. Therefore, as mentioned above, the EIT conditions on detuning can be satisfied by selecting a sharp optical transition in the spectrum.

Figure 3A:
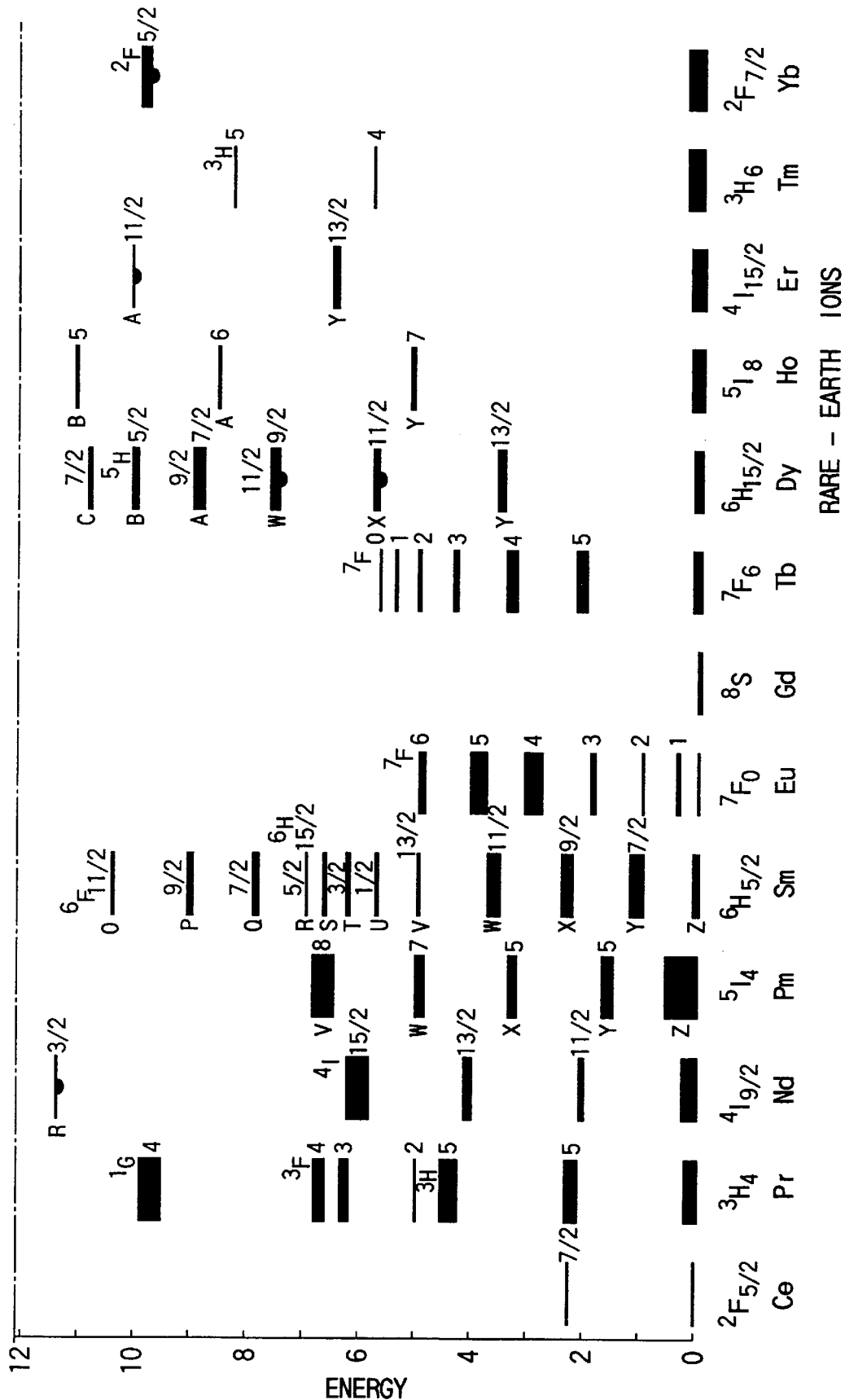
FIGS. 3A to 3C are energy diagrams of 13 kinds of rare-earth ions dispersed in an $LaCl_3$ crystal as an impurity.
Figure 3B:
Figure 3C:

FIG. 3 shows the energy levels of 13 kinds of rare-earth ions (+3 valence) dispersed in an $LaCl_3$ crystal as an impurity. The level diagram is well-known as the DieKe diagram. The thickness of each level represents the size of the crystal field splitting. The energy levels of each ion shown in FIG. 3 depend on the orbital angular momentum L, the spin angular momentum S, and the total angular momentum J as a free ion (gas) on the whole, and are represented by a symbol $^{2S+1}L_J$. The $^{2S+1}L_J$ level of a free ion is degenerated by (2J+1) times, but an ion in a crystal is split further finely due to the microscopic electric field environment (crystal field) at the position where the ion is placed.

The level split at the crystal field is described by the irreducible representation (the irreducible representation of the symmetry) of the point group where the crystal field belongs to. Even different $^{2S+1}L_J$ levels interact to each other via the crystal field if the irreducible representation is the same. That is, the crystal field induces mixing of different $^{2S+1}L_J$ levels. Therefore, for an ion in a crystal, not J but the irreducible representation is the "good quantum number".

The optical transition in the same shell is prohibited in a free ion by the parity, whereas the optical transition is slightly allowed in an ion in a crystal by a component having the odd number symmetry. The selection rule of the optical transition depends on the irreducible representation, and the allowed transition or the forbidden transition emerges according to the combination of the irreducible representation between the levels.

However, since the transition probability is generated hardly owing to the crystal field, even in the allowed transition from the viewpoint of selection rule, the oscillator strength is merely about $10^{-5}$. Further, it is known that even an optical transition predicted intrinsically to be the forbidden transition can sometimes have an oscillator strength of about $10^{-8}$ to $10^{-5}$.

The relaxation rate between two levels can be estimated roughly from the life of an upper level. The value of life may vary depending upon the temperature or the kind of the optical transition, but in general, it is known to have a value defined by the transition probability.

For the value of the relaxation rate predicted by the lifetime, as in the above-mentioned case of the transition probability, it is often the case a large contrast is not obtained between the allowed transition and the forbidden transition.

Therefore, it is not easy to find out the three levels of the Λ, V, Ξ types, satisfying the EIT conditions on the transition probability and relaxation from the impurity levels in a crystal by considering the irreducible representation and the selection rule.

Accordingly, a method of selecting and producing the three levels satisfying the above-mentioned EIT conditions are desired in addition to the method of considering the irreducible representation and the selection rule. The transition probability control by a resonator relates to the production method of the three levels, and it is possible to come closer to an ideal level configuration fitted to the EIT even for three levels with a value of the transition probability or the relaxation rate not satisfying the EIT conditions.

Hereinafter with an example of the Λ type three levels, how the relaxation between the lower two levels influences the EIT characteristics or the LWI characteristics will be examined by comparing the ideal case of the spontaneous emission probability between the lower two levels, which are not excited by light, is zero, that is, between the lower two levels is completely the forbidden transition, and the case of the spontaneous emission probability between the lower two levels is not zero, that is, between the lower two levels cannot completely be the forbidden transition, which is most frequently observed in the real materials.

Then the EIT characteristic or the LWI characteristic of the case utilizing a resonator effect capable of reinforcing or restraining the transition probability will be discussed.

(I) The case of the spontaneous emission probability of the lower two levels is zero (the ideal Λ type three levels)

(I-1) The EIT Characteristic

Figure 4A:
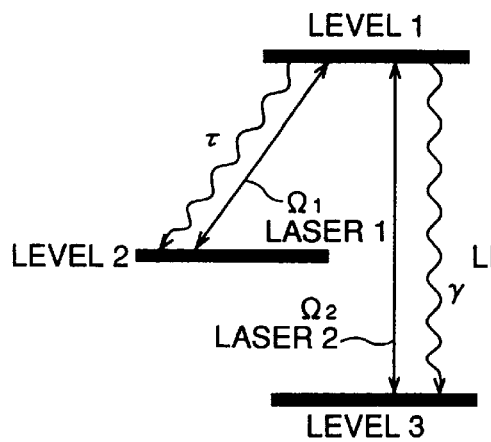
FIGS. 4A to 4D are qualitative energy diagrams showing energy levels, exciting lights, and relaxation processes of the case of the Λ type excitation in terms of the EIT and the LWI of the present invention.

In the ideal Λ type three levels shown in FIG. 4A, the value of the absorption coefficient from the level 3 to the level 1 with the EIT occurring will be sought from the density matrix σ. The density matrix σ of the three levels is shown below.

$$\sigma = \begin{bmatrix} \sigma_{11} & \sigma_{12} & \sigma_{13} \\ \sigma_{21} & \sigma_{22} & \sigma_{23} \\ \sigma_{31} & \sigma_{32} & \sigma_{33} \end{bmatrix}$$

Each subscript i, j (i, j=1, 2, 3) of each matrix element $\sigma_{ij}$ corresponds to the level 1, level 2, level 3, respectively. In the matrix elements, diagonal elements $\sigma_{ii}$ represent the population of each level, the non-diagonal elements $\sigma_{ij}$ represent the coherence between the levels i and j in terms of the quantum dynamics. The light absorption, the light amplification, and the spectrum shape of a substance can be sought from the non-diagonal elements.

With the absorption coefficients of the material concerning the Λ type three levels with respect to the light 1 and the light 2 as $\alpha_1$ and $\alpha_2$, respectively, $$\alpha_1 = C_1 \times Im\{\sigma_{12}\}/\Omega_1 \quad (11a)$$

$$\alpha_2 = C_2 \times Im\{\sigma_{13}\}/\Omega_2 \quad (11b)$$

(where $C_1$ and $C_2$ are a positive real number, and $\Omega_1$ and $\Omega_2$ are a Rabi-frequency of the light 1 and the light 2).

Accordingly, the absorption spectrum from the level 3 to the level 1 with the EIT occurring can be obtained by examining the behavior of $\sigma_{13}$ with respect to the detuning $\Delta\omega_2$ of the light 2 with the detuning $\Delta\omega_1$ of the light 1 connecting between the levels 1 and 2 fixed.

In the following calculations, it is regarded that $\Delta\omega_1=\Delta\omega_2=0$ for either detuning of the light 1 and the light 2.

For the actual calculation of the density matrix $\sigma$, the below-mentioned Liouville's equation of motion is used.

$$(d/dt)\sigma_{ij}=[H',\sigma]_{ij}/(jh/2\pi) \quad (12)$$

$$(H'=H_I+H_R)$$

Here $H_I$ represents the interaction hamiltonian (rotation wave approximation) between the substance and the light, and $H_R$ represents hamiltonian of the relaxation.

$$HI = -(h/4\pi)\begin{bmatrix} 0 & \Omega_1 & \Omega_2 \\ \Omega_1 & 0 & 0 \\ \Omega_2 & 0 & 0 \end{bmatrix}$$

$$[H_R,\sigma]_{11}/(jh/2\pi)=-(\Gamma+\gamma)\sigma_{11} \quad (14a)$$

$$[H_R,\sigma]_{22}/(jh/2\pi)=\Gamma\sigma_{11} \quad (14b)$$

$$[H_R,\sigma]_{33}/(jh/2\pi)=\Gamma\sigma_{11} \quad (14c)$$

$$[H_R,\sigma]_{12}/(jh/2\pi)=-(\Gamma+\gamma)\sigma_{12}/2 \quad (14d)$$

$$[H_R,\sigma]_{13}/(jh/2\pi)=-(\Gamma+\gamma)\sigma_{13}/2 \quad (14e)$$

$$[H_R,\sigma]_{23}/(jh/2\pi)=0 \quad (14f)$$

(where $\Gamma$ represents the spontaneous emission rate from the level 1 to the level 2, and $\gamma$ represents the spontaneous emission rate from the level 1 to the level 3.)

The intensity of the light 2 is extremely weak with respect to the light 1 ($\Omega_2<<\Omega_1$), and $\Omega_2<<\Gamma,\gamma$. From the formulae (12), (13), (14), the equations of motion for each matrix element $\sigma_{ij}$ are as follows.

$$2(d/dt)\sigma_{11}=j\Omega_1(\sigma_{21}-\sigma_{12})+j\Omega_2(\sigma_{31}-\sigma_{13})-2(\Gamma+\gamma)\sigma_{11} \quad (15a)$$

$$2(d/dt)\sigma_{22}=-j\Omega_1(\sigma_{21}-\sigma_{12})+2\Gamma\sigma_{11} \quad (15b)$$

$$2(d/dt)\sigma_{33}=-j\Omega_2(\sigma_{31}-\sigma_{13})+2\gamma\sigma_{11} \quad (15c)$$

$$2(d/dt)\sigma_{12}=j\Omega_1(\sigma_{22}-\sigma_{11})+j\Omega_2\sigma_{32}-(\Gamma+\gamma)\sigma_{12} \quad (15d)$$

$$2(d/dt)\sigma_{13}=j\Omega_2(\sigma_{33}-\sigma_{11})+j\Omega_1\sigma_{23}-(\Gamma+65)\sigma_{13} \quad (15e)$$

$$2(d/dt)\sigma_{23}=-j\Omega_2\sigma_{21}+j\Omega_1\sigma_{13} \quad (15f)$$

(where $1=\sigma_{11}+\sigma_{22}+\sigma_{33}$, $\sigma_{ji}$)

The value of each matrix element in the steady-store can be sought by substituting the left side of the formulas (15) with zero. Im $\{\sigma 13\}$ is found by solving them.

$$Im\{\sigma_{13}\}=0 \quad (16)$$

Consequently, the absorption coefficient of the light 2 $\alpha_2$ at $\Delta\omega_1=\Delta\omega_2$ (here an angular frequency satisfying $\Delta\omega_1=\Delta\omega_2=0$) is $$\alpha_2=0 \quad (17).$$

That is, it is learned that the light 2 transmits completely at an angular frequency where intrinsically a strong absorption takes place.

(I-2) The LWI Characteristic

Figure 4B:
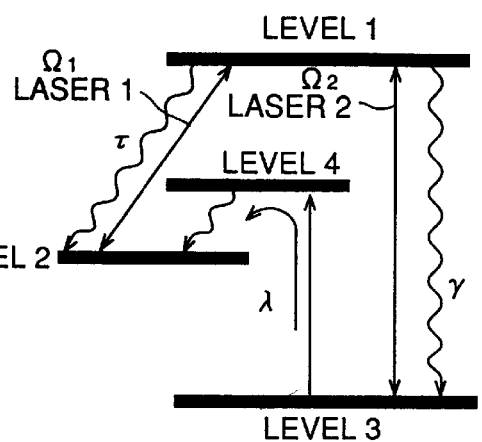

In the configuration shown in FIG. 4B, the amplification of the light 2 will be examined from the non-diagonal element $\sigma_{13}$ of the density matrix. In the LWI, it is necessary to excite electrons from the ground state 3 either to the excited-state 1 or the excited-state 2.

As shown in FIG. 4B, the electron excitation is considered to be from the level 3 to the level 2. However, since between the levels 2 and 3 is the forbidden transition, a light is excited from the level 3 to the level 4, and the electrons are pumped to the level 2 utilizing the relaxation from the level 4.

With such an excitation method, it is possible to have the laser oscillation of a light beam with a short wavelength utilizing a light beam with a long wavelength. Here the pumping rate from the level 3 to the level 2 is $\lambda$. As in the above-mentioned (I-1), the case of $\Delta\omega_1=\Delta\omega_2=0$ will be calculated.

If Im $\{\sigma 13\}$ in the formula (11b) is positive, $\alpha_2$ becomes positive accordingly so that the light 2 is absorbed.

On the other hand, if Im $\{\sigma 13\}$ is negative, $\alpha_2$ becomes negative accordingly. The negative absorption coefficient indicates the light amplification. Therefore, whether the light 2 is absorbed or amplified depends upon the sign of Im $\{\sigma 13\}$.

The form of the interaction hamiltonian $H_I$ is the same as in (I-1). However, the relaxation hamiltonian $H_R$ slightly differs in that an incoherent pumping term $\lambda$ from the level 3 to the level 2 is further added.

$$[H_R,\sigma]_{11}/(jh/2\pi)=-(\Gamma+\gamma)\sigma_{11} \quad (18a)$$

$$[H_R,\sigma]_{22}/(jh/2\pi)=\Gamma\sigma_{11}+\lambda\sigma_{33} \quad (18b)$$

$$[H_R,\sigma]_{33}/(jh/2\pi)=\gamma\sigma_{11}+\lambda\sigma_{33} \quad (18c)$$

$$[H_R,\sigma]_{12}/(jh/2\pi)=-(\Gamma+\gamma)\sigma_{12}/2 \quad (18d)$$

$$[H_R,\sigma]_{13}/(jh/2\pi)=-(\Gamma+\gamma+\lambda)\sigma_{13}/2 \quad (18e)$$

$$[H_R,\sigma]_{23}/(jh/2\pi)=-\lambda\sigma_{23}/2 \quad (18f)$$

By substituting the formula (12) with the formulas for solving the equations of motion for each matrix element $\sigma_{ij}$, and the absorption coefficient $\alpha_2$ of the light 2 is sought from Im $\{\sigma 13\}$.

$$\alpha_2=-C_2\lambda(\Gamma+\lambda)/[2\Omega_1^2(\gamma+2\lambda)] \quad (19)$$

In the formula (19), $\alpha_2$ does not depend on $\lambda$, but always is negative, indicating that the light 2 is amplified.

(II) The Case of the Spontaneous Emission probability of the lower two levels is not zero (the $\Lambda$ type three levels in real materials)

(II-1) The EIT characteristic

Figure 4C:
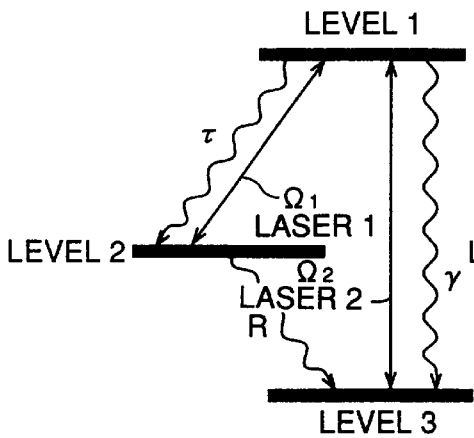

The absorption coefficient from the level 3 to the level 1 with the EIT occurring will be sought for the $\Lambda$ type three levels having the relaxation process of the spontaneous emission rate R between the lower two levels shown in FIG. 4C. Similarly, the case of $\Delta\omega_1=\Delta\omega_2=0$ will be calculated.

The form of the interaction hamiltonian $H_I$ is the same as in (I-1). However, the relaxation hamiltonian $H_R$ slightly differs in that a spontaneous emission term R from the level 2 to the level 3 is further added.

$$[H_R,\sigma]_{11}/(jh/2\pi)=-(\Gamma+\gamma)\sigma_{11} \quad (20a)$$

$$[H_R,\sigma]_{22}/(jh/2\pi)=\Gamma\sigma 11+\lambda\sigma_{22} \quad (20b)$$

$$[H_R,\sigma]_{33}/(jh/2\pi)=\gamma\sigma 11+\lambda\sigma_{22} \quad (20c)$$

$$[H_R,\sigma]_{12}/(jh/2\pi)=-(\Gamma+\gamma+R)\sigma_{12}/2 \quad (20d)$$

$$[H_R, \sigma]_{13}/(jh/2\pi) = -(\Gamma+\gamma)\sigma_{13}/2 \tag{20e}$$

$$[H_R, \sigma]_{23}/(jh/2\pi) = -R\sigma_{23}/2 \tag{20f}$$

By substituting the formula (12) with the formulas for solving the equations of motion for each matrix element $\sigma_{ij}$, and the absorption coefficient $\alpha_2$ of the light 2 is sought from Im $\{\sigma 13\}$.

$$\alpha_2 = C_2 R/2\Omega_1^2 \tag{21}$$

From the formula (21), it is learned that when the relaxation occurs between the lower two levels, as the relaxation rate increases, the value of the absorption coefficient increases accordingly. This means it will be more unlikely that the EIT occurs, deriving from the relaxation.

(II-2) The LWI Characteristic

Figure 4D:
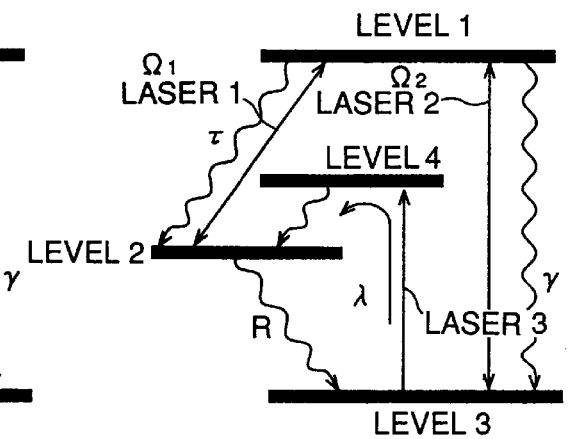

In the configuration having the relaxation process of the spontaneous emission rate R between the lower two levels shown in FIG. 4D, the amplification of the light 2 will be sought from the value of the absorption coefficient. Here the pumping rate from the level 3 to the level 2 is $\lambda$, and the spontaneous emission rate from the level 2 to the level 3 is R. As in the above-mentioned, the case of $\Delta\omega_1 = \Delta\omega_2 = 0$ will be calculated.

The form of the interaction hamiltonian $H_I$ is the same as in (I-1). However, the relaxation hamiltonian $H_R$ slightly differs in that a pumping term $\lambda$ from the level 3 to the level 2 and a spontaneous emission rate R are further added.

$$[H_R, \sigma]_{11}/(jh/2\pi) = -(\Gamma+\gamma)\sigma_{11} \tag{22a}$$

$$[H_R, \sigma]_{22}/(jh/2\pi) = \Gamma\sigma_{11} - R\sigma_{22} + \lambda\sigma_{33} \tag{22b}$$

$$[H_R, \sigma]_{33}/(jh/2\pi) = \gamma\sigma_{11} + R\sigma_{22} - \lambda\sigma_{33} \tag{22c}$$

$$[H_R, \sigma]_{12}/(jh/2\pi) = -(\Gamma+\gamma+R)\sigma_{12}/2 \tag{22d}$$

$$[H_R, \sigma]_{13}/(jh/2\pi) = -(\Gamma+\gamma+\lambda)\sigma_{13}/2 \tag{22e}$$

$$[H_R, \sigma]_{23}/(jh/2\pi) = -(R+\lambda)\sigma_{23}/2 \tag{22f}$$

By substituting the formula (12) with the formulas for solving the equations of motion for each matrix element $\sigma_{ij}$, and the absorption coefficient $\alpha_2$ of the light 2 is sought from Im $\{\sigma 13\}$.

$$\alpha_2 = C_2[R(\gamma+R) - \lambda(\Gamma+\lambda)]/[2\Omega_1^2(\gamma+R+2\lambda)] \tag{23}$$

It is learned that in this case a laser oscillation will not occur unless $\lambda$ exceeds a certain value although a laser oscillation is possible without a threshold in the case without relaxation between the lower two levels.

(III) Application of the Resonator Effect to the EIT and the LWI

Results obtained so far will be reviewed. In order to have a better prospect, $\gamma = \phi\Gamma$, $\lambda = \phi\Gamma$, $R = \theta\Gamma(\phi, \phi, \theta > 0)$ will be adopted.

The absorption coefficient $\alpha_2$ of the light 2 without the relaxation between the lower two levels is:

EIT; $\alpha_2 = 0$ \qquad(24a)

LWI; $\alpha_2 = -C_2\Gamma\phi(1+\phi)/[2\Omega_1^2(\phi+2\phi)]$ \qquad(24b)

The absorption coefficient $\alpha_2$ of the light 2 with the relaxation between the lower two levels is:

EIT; $\alpha_2 = C_2\theta\Gamma/2\Omega_1^2$ \qquad(25a)

LWI; $\alpha_2 = -C_2\Gamma[\phi(1+)-\theta(\phi+\theta)]/[2\Omega_1^2(\phi+2\phi+\theta)]$ \qquad(25b)

$\theta$ in the case with the relaxation between the lower two levels shows the ratio of the spontaneous emission rate between the lower two levels not coupled by a light with respect to the spontaneous emission rate between the levels coupled by the lights 1 and 2. By having $\theta$ smaller, the state of the formulas (25a), (25b) will be asymptotic to the state of the EIT and LWI, respectively.

From the above-mentioned, it is learned that the modulation of the optical transition based on the quantum coherence is possible in conducting the EIT or the LWI in an ordinary system where the transition probability between the lower two levels is not zero, if the transition probabilities between the levels coupled by the lights 1, 2 and between the lower two levels have a contrast.

In the transition probability control by a resonator, the strength of the enhancement or inhibition of the spontaneous emission probability is determined by the reflectances of two mirrors comprising the resonator.

The ratio of the enhancement of the spontaneous emission probability by the resonator effect $F_{ENH}$ and the ratio of the inhibition $F_{INH}$ can be described as follows.

$$F_{ENH} \sim [ln(R1 \cdot R2)]^{-1} \tag{26a}$$

$$F_{INH} \sim ln(R1 \cdot R2) \tag{26b}$$

R1, R2 represent the reflectances of the two mirrors.

From the formula (26), the size of enhancement and inhibition of the spontaneous emission probability will be estimated. With $R_1 = 100\%$ and $R_2 = 98\%$, a value~50 for $F_{ENH}$ and a value~0.02 for $F_{INH}$ are obtained.

The result means that the spontaneous emission probability can be reinforced by 50 times by having the angular frequency of the resonance mode in phase with the transition energy, or can be restrained to 1–50th by having it out of phase.

From the above-mentioned, in the formula (25), it is learned that even with the ratio of the spontaneous emission probability $\theta$~1, by providing a resonator, $\Lambda$ type three levels having a value of about $\theta$~$F_{INH}/F_{ENH}$=0.0004 can be achieved so that the EIT characteristic and the LWI characteristic can be dramatically improved.

Hitherto with the $\Lambda$ type three levels as an example, it has been described that both the EIT characteristic and the LWI characteristic hardly emerge in the case the transition probability or the relaxation rate of the lower two levels is not zero, and good EIT and LWI characteristics can be obtained by providing a resonator even in such a substance.

By such a method, the range of substances applied with the EIT widens so that the LWI laser can be achieved in a solid as well as various optical elements based on the quantum coherence, such as a light modulation element, can be realized.

Various embodiments of the present invention will be described with reference to drawings.

The first embodiment of the present invention will be explained with reference to FIG. 5.

Figure 5:
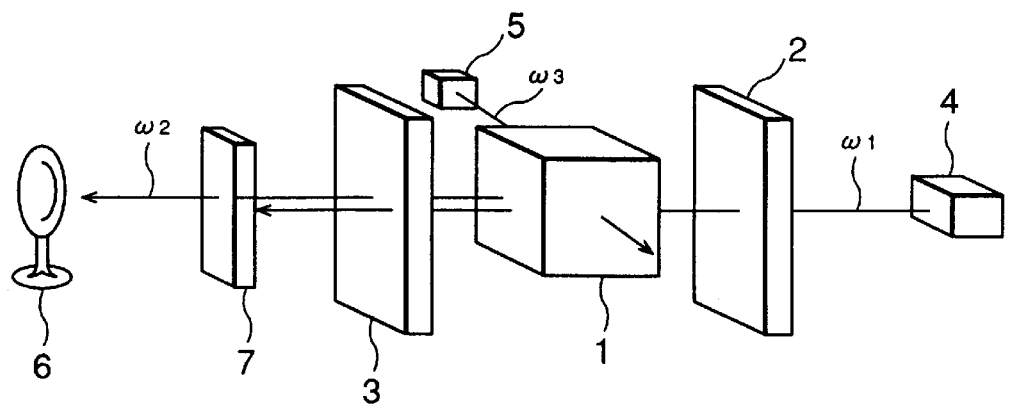
FIG. 5 is a diagram showing the schematic configuration of a first embodiment of an LWI laser of the present invention.

FIG. 5 is a diagram showing the schematic configuration of the first embodiment of an LWI laser of the present invention.

For all the $\Lambda$, V, $\Xi$, type three levels, two kinds of lights, that is, a controlling light and a pumping light are used. In the $\Lambda$ type three levels, the controlling light takes a role of supposedly exciting between the levels 1 and 2, and the pumping light takes a role of pumping electrons from the level 3 to the level 2 via the level 4.

In the V type three levels, the controlling light takes a role of supposedly exciting between the levels 2 and 3, and the pumping light takes a role of pumping electrons from the level 2 to the level 1 via the level 4.

In the Ξ type three levels, the controlling light takes a role of supposedly exciting between the levels 1 and 2, and the pumping light takes a role of pumping electrons from the level 3 to the level 2 via the level 4.

An LWI laser of the embodiment comprises an EIT layer 1 of a solid containing an impurity, two mirrors 2, 3 comprising a resonator, arranged facing to each other at the opposite position with respect to the EIT layer 1, a controlling light source 4 for entering a controlling light into the EIT layer 1, a pumping light source 5 for entering a pumping light into the EIT layer 1, a photodiode 6 for detecting the intensity of an LWI laser light (a signal light outputted from the EIT layer) outputted from the mirror 3 to the outside, and a filter 7, arranged between the photodiode 6 and the mirror 3, for cutting the controlling light.

In the LWI laser shown in FIG. 5, the mirrors 2, 3 are arranged with the interval of 10 cm with the EIT layer 1 interposed therebetween.

Figure 6A:
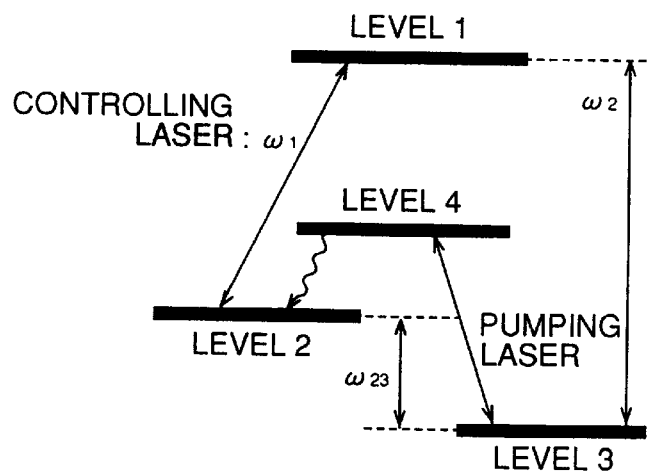
FIGS. 6A to 6C are quantitative energy diagrams showing the relationship of energy levels, exciting lights, relaxation processes, and pumping lights with the LWI laser of the first embodiment shown in FIG. 5 in the EIT layer of the present invention.

FIGS. 6A schematically shows the energy levels, controlling light, pumping light and a laser light generated by the LWI. Here the photon energies $\omega_1$, $\omega_2$ are in phase with the resonance mode.

In the case of the Λ type excitation shown in FIG. 6A, as a material used for the EIT layer, a system where the symmetry of the level 2 and the level 3 is equivalent, and that of the level 1 is different is selected. The controlling light supposedly excites between the levels 1 and 2, and the pumping light pumps electrons from the level 3 to the level 2 utilizing the relaxation from the level 4 to the level 2.

According to the configuration, a laser oscillation takes place without the population inversion derived from the LWI. The photon energy of the laser light $\omega_2$ is described as $\omega_2 = \omega_1 + \omega_{23}$, where $\omega_1$ is the photon energy of the controlling light, and $\omega_{23}$ is the central value of the energy difference between the levels 2, 3.

Figure 6B:
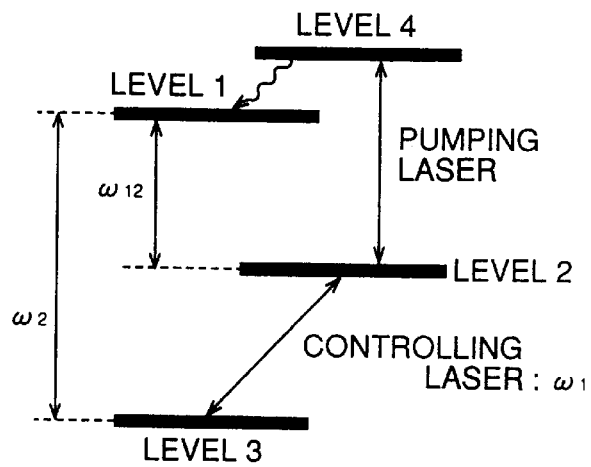

In the case of the V type excitation shown in FIG. 6B, as a material used for the EIT layer, a system where the symmetry of the level 1 and the level 2 is equivalent, and that of the level 3 is different is selected. The controlling light actually excites between the levels 2 and 3, and the pumping light pumps electrons from the level 2 to the level 1 utilizing the relaxation from the level 4 to the level 1.

According to the configuration, a laser oscillation takes place without the population inversion derived from the LWI. The photon energy of the laser light $\omega_2$ is described as $\omega_2 = \omega_1 + \omega_{12}$, where $\omega_1$ is the energy of the controlling light, and $\omega_{12}$ is the central value of the energy difference between the levels 1, 2. Here the photon energies $\omega_1$, $\omega_2$ are in phase with the resonance mode as in the case of FIG. 6A.

Figure 6C:
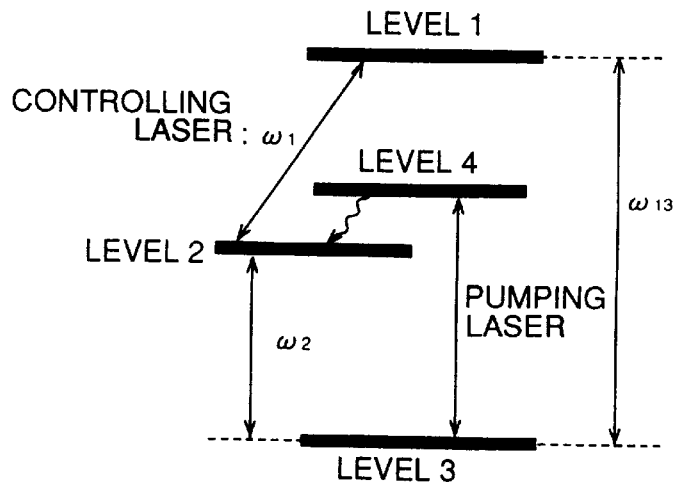

In the case of the Ξ type excitation shown in FIG. 6C, as a material used for the EIT layer, a system where the symmetry of the level 1 and the level 3 is equivalent, and that of the level 2 is different is selected. The controlling light supposedly excites between the levels 1 and 2, and the pumping light pumps electrons from the level 3 to the level 2 utilizing the relaxation from the level 4 to the level 2.

According to the configuration, a laser oscillation takes place without the population inversion derived from the LWI. The photon energy of the laser light $\omega_2$ is described as $\omega_2 = \omega_{13} - \omega_1$, where $\omega_1$ is the energy of the controlling light, and $\omega_{13}$ is the central value of the energy difference between the levels 1, 3. The photon energies $\omega_1$, $\omega_2$ are in phase with the resonance mode as in the case of FIGS. 6A and 6B.

The second embodiment of the present invention will be explained.

The second embodiment is more specific compared with the LWI laser shown in FIG. 5. That is, in this embodiment, the EIT layer comprises $Y_3Al_5O_{12}$ (YAG) where $Pr^{3+}$ is dispersed as an impurity, both the controlling light source 4 and the pumping light source 5 comprise a semiconductor laser, and the photodiode 6 comprises an Si photodiode. In the second embodiment, the mirrors 2, 3 are arranged with the interval of 10 cm.

Figure 7:
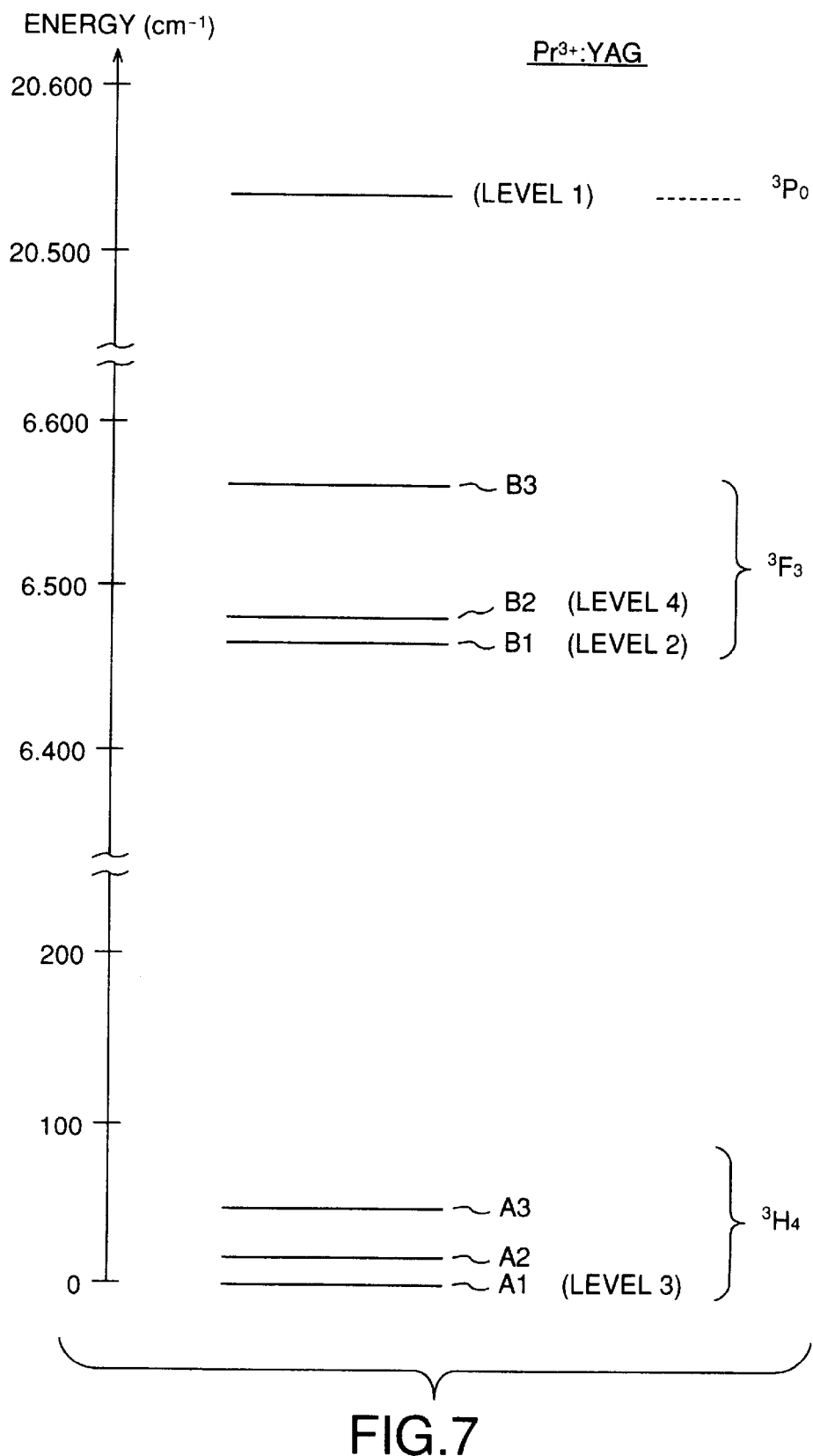
FIG. 7 is a diagram showing the energy levels of $Pr^{3+}$ in $Pr^{3+};Y_3Al_5O_{12}$ used as the EIT layer in the LWI laser of the second embodiment of the present invention.

Impurity levels of $Pr^{3+}$ in YAG was used as the three energy levels. As shown in FIG. 7, the $^3P_0$ level of the electron configuration $(f)^2$ was selected as the uppermost level 1, the B1 level split in the crystal field among the $^3F_3$ level of the electron configuration $(f)^2$ was selected as the middle level 2, and the A1 level split in the crystal field among the $^3H_4$ level of the electron configuration $(f)^2$, which was the ground state, was selected as the lowest level 3. As to the symmetry of each level, the $^3P_0$ level was $\Gamma_1$, and the $^3F_3$ (B1) level and the $^3H_4$ (A1) level were $\Gamma_3$.

Accordingly, the $^3F_3$ (B1)→$^3P_0$ transition between the levels 1 and 2 is $\Gamma_3 \to \Gamma_1$. The $^3H_4$ (A1)→$^3P_0$ transition between the levels 1 and 3 is $\Gamma_3 \to \Gamma_1$. The $^3H_4$ (A1)→$^3F_3$ (B1) transition between the levels 2 and 3 is $\Gamma_3 \to \Gamma_1$. As to the selection rule of the optical transition concerning the electric dipole transition, the transitions between the levels 1 and 2 and between the levels 1 and 3 are allowed, and the transition between the levels 2 and 3 is forbidden.

The $^3F_3$ (B2) level was chosen as the level 4 for pumping electrons from the level 3 to level 2. Since the symmetry of the $^3F_3$ (B2) level is $\Gamma_1$, the $^3H_4$ (A1)→$^3F_3$ (B2) transition becomes allowed from the selection rule.

The electrons excited to the $^3F_3$ (B2) level emit phonons and quickly relaxes to the $^3F_3$ (B1) level. Therefore, by conducting electron excitation at the $^3F_3$ (B2) level, population can be formed at the $^3F_3$ (B1) level.

As to the configuration of the resonator, the mirrors 2, 3 are arranged with the interval of 10 cm as mentioned above so that the $^3F_3$ (B1)→$^3P_0$ transition and the $^3H_4$ (A1)→$^3P_0$ transition between the levels 1 and 2 and between the levels 1 and 3 are in phase with the resonance mode. Whether or not a transition is in phase with the resonance mode can be checked by examining the emission life from the $^3P_0$ level to the $^3F_3$ (B1) level and to the $^3H_4$ (A1) level.

It is comparatively easy to confirm that a transition is in phase with the resonance mode since the emission life is shorter compared with the case of not comprising a resonator. At this time, the $^3H_4$ (A1)→$^3F_3$ (B1) transition between the levels 2 and 3 is out of phase with the resonance mode.

As to the position of the YAG crystal in the resonator, the configuration is as mentioned below.

The symmetry of $Pr^{3+}$ in YAG belongs to the point group $D_2$. The most symmetrical axis in the point group $D_2$ is the twofold axis. Examples of the twofold axes in a crystal include the [110] axis, the [101] axis, and the [011] axis. From the selection rule, both the $^3F_3$ (B1)→$^3P_0$ transition and the $^3H_4$ (A1)→$^3P_0$ transition between the levels 1 and 2, and between the levels 1 and 3 behave as the a transition with respect to the twofold axis. Accordingly, the YAG crystal is arranged so that the [110] axis is parallel to the resonator axis.

Accordingly, in the LWI laser, electrons are light-pumped from the $^3H_4$ (A1) level to the $^3F_3$ (B1) level while light-exciting between the $^3F_3$ (B1) and $^3P_0$ levels. A light energy $\omega_1$ of the controlling light, which corresponds with the $^3F_3$ (B1)→$^3P_0$ transition between the levels 1 and 2, was chosen. And a photon energy of the pumping light, which corresponds with the $^3H_4$ (A1)→$^3F_3$ (B2) transition between the levels 3 and 4, was chosen. The intensity of the controlling light was set to be 0.1 W, and the intensity of the pumping light to enter the EIT layer was set to be 1 W.

Based on the above-mentioned element configuration, the existence of the laser oscillation from the $^3P_0$ level to the $^3H_4$ (A1) level was examined.

Figure 8:
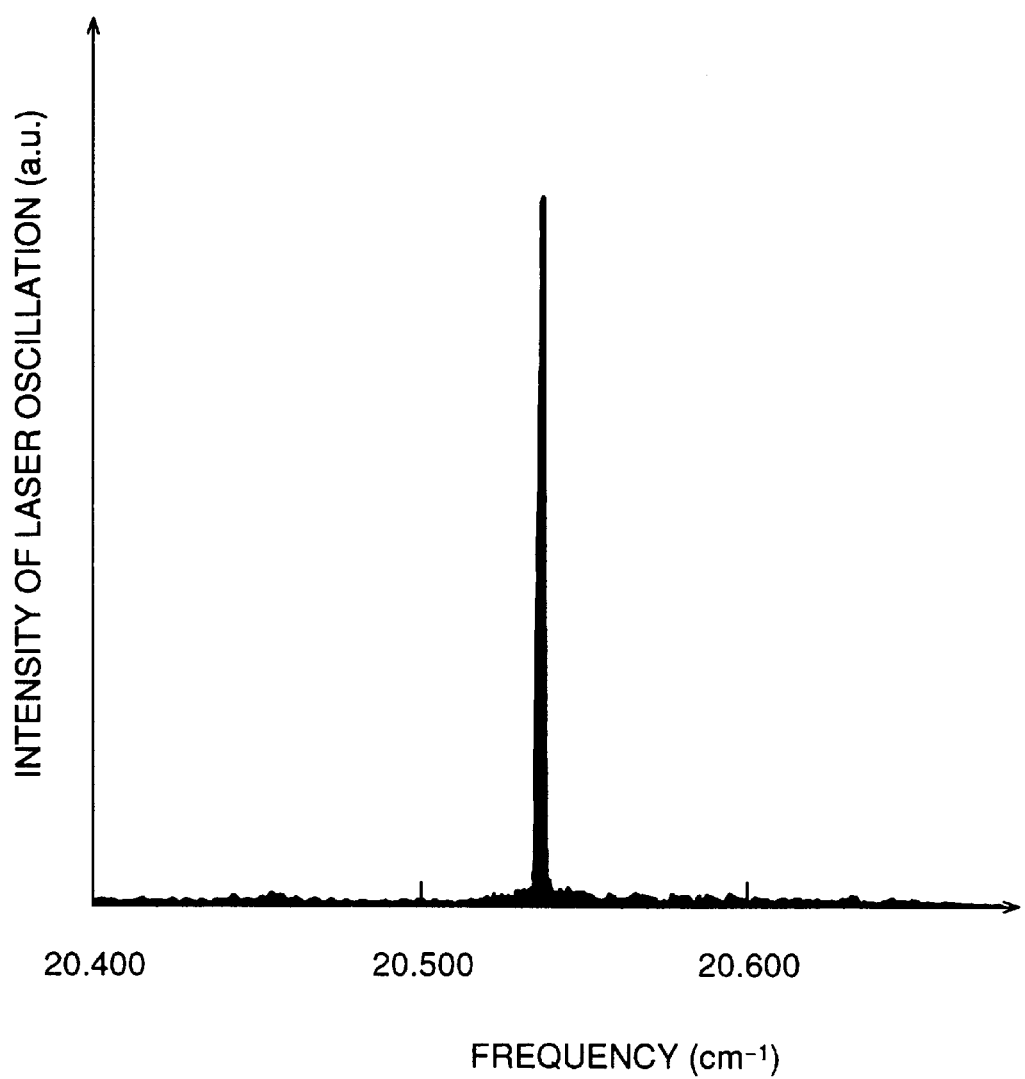
FIG. 8 is a graph showing the result of inspecting the spectrum of the LWI oscillation when a controlling light and a pumping light are irradiated in the LWI laser of the second embodiment of the present invention.

As a result, continuous oscillation of a laser light was observed in the vicinity of the frequency 20534 cm$^{-1}$ corresponding to the $^3P_0 \rightarrow {}^3H_4$ (A1) transition as shown in FIG. 8. The intensity was about 0.5 mW.

A configuration with the distance between the mirrors changed will be explained.

With the LWI laser of the same configuration as the second embodiment except that the $^3F_3$ (B1)$\rightarrow {}^3P_0$ transition between the levels 1 and 2 was out of phase with the resonance mode by changing the distance between the mirrors from 10 cm, the existence of the laser oscillation from the $^3P_0$ level to the $^3H_4$ (A1) level was examined.

As a result, in this comparative embodiment, the laser oscillation was not observed. From the heretofore mentioned, it is learned that a resonator needs to be formed with sufficient consideration on the angular frequency of the resonance mode and the size of the transition energy for obtaining the LWI utilizing an impurity in a solid.

The third embodiment of the present invention will be explained.

The third embodiment is more specific compared with the LWI laser shown in FIG. 5. That is, in this embodiment, the EIT layer comprises YAG where Pr$^{3+}$ is dispersed as an impurity, the controlling light source 4 comprises second harmonics of a semiconductor laser and the pumping light source 5 comprise fundamental harmonics of a semiconductor laser, and the photodiode 6 comprises an Si photodiode. In the third embodiment, the mirrors 2, 3 are arranged with the interval of 10 cm.

Figure 9:
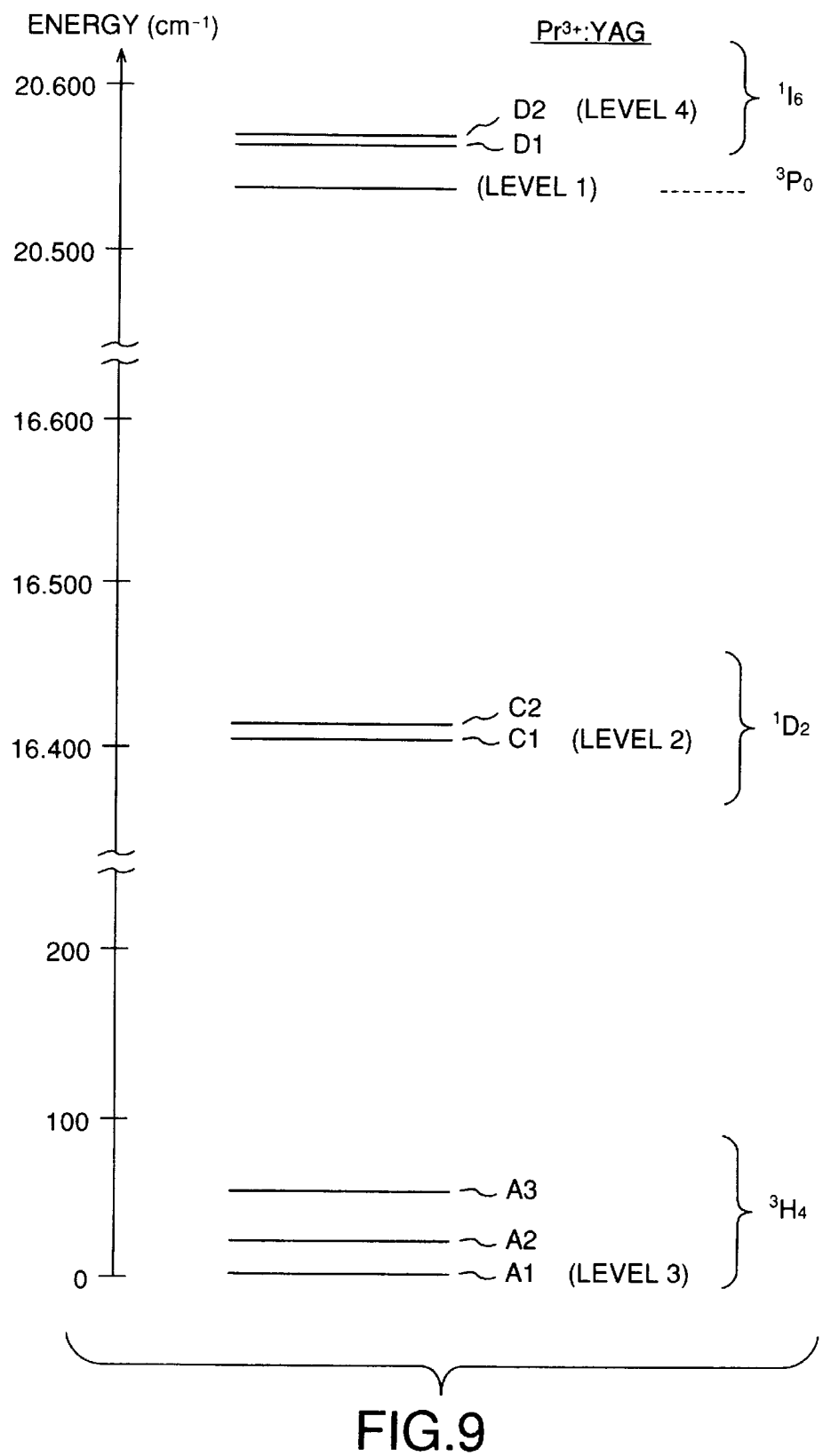
FIG. 9 is a diagram showing the energy levels of $Pr^{3+}$ in $Pr^{3+};Y_3Al_5O_{12}$ used as the EIT layer in the LWI laser of the third embodiment of the present invention.

Impurity levels of Pr$^{3+}$ in YAG was used as the three energy levels. As shown in FIG. 9, the $^3P_0$ level of the electron configuration (f)$^2$ was selected as the uppermost level 1, the C1 level split in the crystal field among the $^1D_2$ level of the electron configuration (f)$^2$ was selected as the middle level 2, and the A1 level split in the crystal field among the $^3H_4$ level of the electron configuration (f)$^2$, which was the ground state, was selected as the lowest level 3. As to the symmetry of each level, the $^3P_0$ level and the $^1D_2$ (C1) level were $\Gamma_1$, and the $^3H_4$ (A1) level was $\Gamma_3$.

Accordingly, the $^1D_2$ (C1)$\rightarrow {}^3P_0$ transition between the levels 1 and 2 comprises $\Gamma_1 \rightarrow \Gamma_1$. The $^3H_4$ (A1)$\rightarrow {}^3P_0$ transition between the levels 1 and 3 and the $^3H_4$ (A1)$\rightarrow {}^1D_2$ (C1) transition between the levels 2 and 3 comprise $\Gamma_3 \rightarrow \Gamma_1$.

As to the selection rule of the optical transition concerning the electric dipole transition, the transition between the levels 1 and 2 is forbidden, and the transitions between the levels 1 and 3 and between the levels 2 and 3 are allowed.

The $^1I_6$ (D2) level was chosen as the level 4 for pumping electrons from the level 2 to level 1. Since the symmetry of the $^1I_6$ (D2) level is $\Gamma_3$, the $^1D_2$ (C1)$\rightarrow {}^1I_6$ (D2) transition becomes allowed from the selection rule.

The electrons excited to the $^1I_6$ (D2) level emit phonons and quickly relaxes to the $^3P_0$ level. Therefore, by conducting electron excitation at the $^1I_6$ (D2) level, population can be formed at the $^3P_0$ level.

As to the configuration of the resonator, the mirrors 2, 3 are arranged with the interval of 10 cm as mentioned above so that the $^3H_4$ (A1)$\rightarrow {}^3P_0$ transition and the $^3H_4$ (A1)$\rightarrow {}^1D_2$ (C1) transition between the levels 1 and 3 and between the levels 2 and 3 are in phase with the resonance mode.

Whether or not a transition is in phase with the resonance mode can be checked by examining the emission life from the $^3P_0$ level to the $^3H_4$ (A1) level, and from the $^1D_2$ (C1) level to the $^3H_4$ (A1) level. At this time the $^1D_2$ (C1)$\rightarrow {}^3P_0$ transition between the levels 1 and 2 is out of phase with the resonance mode.

As to the position of the YAG crystal in the resonator, the configuration is as mentioned below.

From the selection rule, both the $^3F_3$ (B1)$\rightarrow {}^3P_0$ transition and the $^3H_4$ (A1)$\rightarrow {}^3P_0$ transition between the levels 1 and 2 and between the levels 1 and 3 behave as the σ transition with respect to the twofold axis in a crystal (such as the [110] axis, the [101] axis, the [011] axis). Accordingly, the YAG crystal is arranged so that the [110] axis is parallel to the resonator axis.

Accordingly, in the LWI laser, electrons are light-pumped from the $^1D_2$ (C1) level to the $^3P_0$ level while light-exciting between the $^3H_4$ (A1) and $^1D_2$ (C1) levels. A light energy $\omega_1$ of the controlling light, which corresponds with the $^3H_4$ (A1)$\rightarrow {}^1D_2$ (C1) transition between the levels 2 and 3, was chosen. And a photon energy of the pumping light, which corresponds with the $^1D_2$ (C1)$\rightarrow {}^1I_6$ (D2) transition between the levels 2 and 4, was chosen.

The intensity of the controlling light was set to be 0.1 W, and the intensity of the pumping light to enter the EIT layer was set to be 1 W.

Based on the above-mentioned element configuration, the existence of the laser oscillation from the $^3P_0$ level to the $^3H_4$ (A1) level was examined.

As a result, continuous oscillation of a laser light was observed in the vicinity of the frequency 20534 cm$^{-1}$ corresponding to the $^3P_0 \rightarrow {}^3H_4$ (A1) transition. The intensity was about 1.2 mW.

A configuration with the distance between the mirrors 10 cm changed will be explained.

With the LWI laser of the same configuration as the third embodiment except that the $^3H_4$ (A1)$\rightarrow {}^1D_2$ (C1) transition between the levels 2 and 3 was out of phase with the resonance mode by changing the distance between the mirrors from 10 cm through the use of the piezoelectric element, the existence of the laser oscillation from the $^3P_0$ level to the $^3H_4$ (A1) level was examined. As a result, in this comparative embodiment, the laser oscillation was not observed.

The fourth embodiment of the present invention will be explained.

The fourth embodiment is more specific compared with the LWI laser shown in FIG. 5. That is, in this embodiment, the EIT layer comprises YAG where Ho$^{3+}$ is dispersed as an impurity, both the controlling light source 4 and the pumping light source 5 comprise a semiconductor laser, and the photodiode 6 comprises an Si photodiode. In the fourth embodiment, the mirrors 2, 3 are arranged with the interval of 11 cm.

Figure 10:
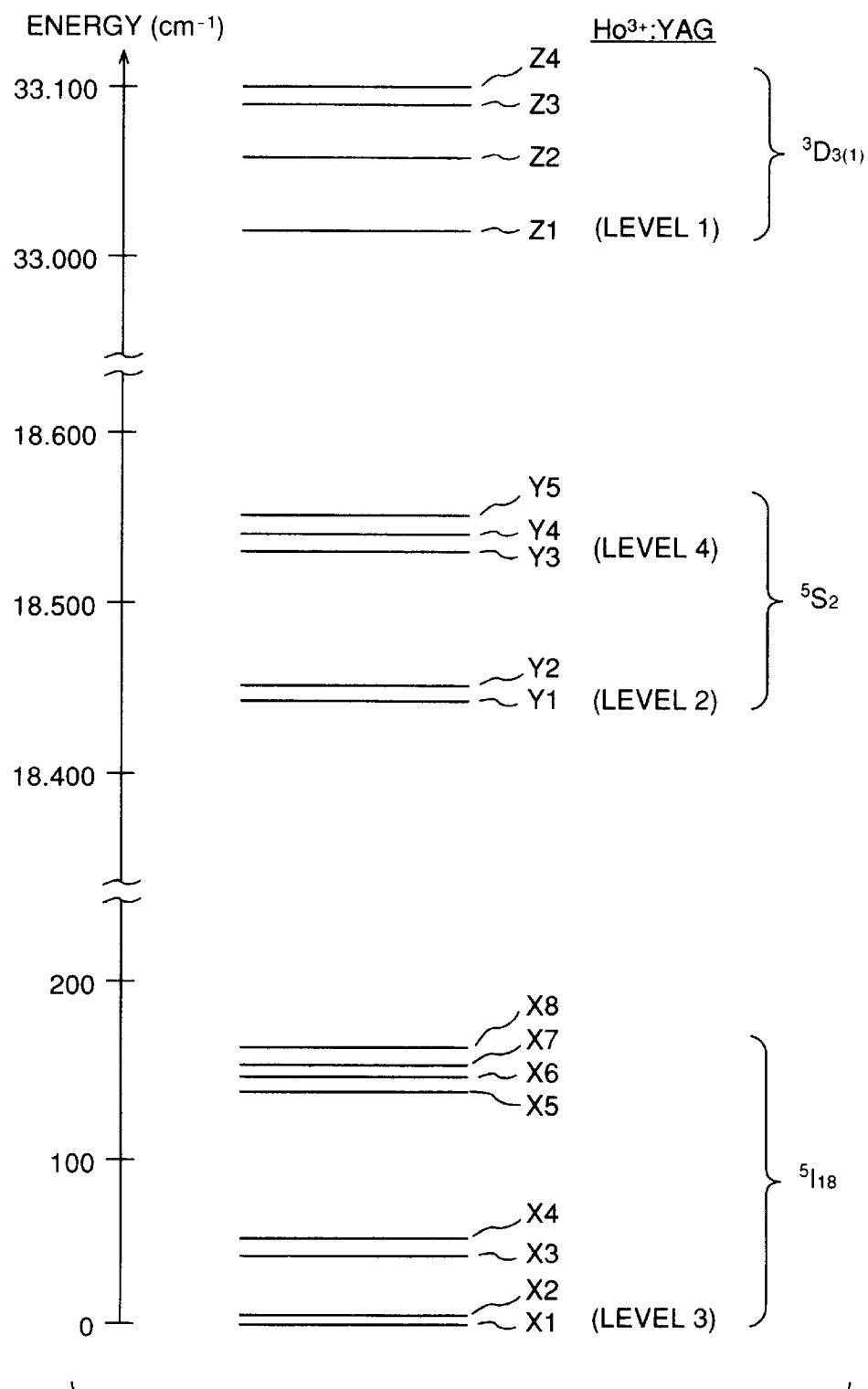
FIG. 10 is a diagram showing the energy levels of $Ho^{3+}$ in $Ho^{3+};Y_3Al_5O_{12}$ used as the EIT layer in the LWI laser of the fourth embodiment of the present invention.

Impurity levels of Ho$^{3+}$ in YAG was used as the three energy levels. As shown in FIG. 10, the Z1 level split in the crystal field among the $^3D_3$ (1) level of the electron configuration (f)$^{10}$ was selected as the uppermost level 1, the Y1 level split in the crystal field among the $^5S_2$ level of the electron configuration (f)$^{10}$ was selected as the middle level 2, and the X1 level split in the crystal field among the $^5I_8$ level of the electron configuration (f)$^{10}$, which was the ground state, was selected as the lowest level 3. As to the symmetry of each level, the $^3D_3$ (1) (Z1) level and the $^5I_8$ (X1) level were $\Gamma_2$, and the $^5S_2$ (Y1) level was $\Gamma_1$.

Accordingly, the $^5S_2$ (Y1)$\rightarrow {}^3D_3$ (1) (Z1) transition between the levels 1 and 2 and the $^5I_8$ (X1)$\rightarrow {}^5S_2$ (Y1) transition between the levels 2 and 3 comprise $\Gamma_1 \rightarrow \Gamma_2$ transition. The $^5I_8$ (X1)$\rightarrow {}^3D_3$ (1) (Z1) transition comprises $\Gamma_2 \rightarrow \Gamma_2$ transition. As to the selection rule of the optical transition concerning the electric dipole transition, the transition between the levels 1 and 3 is forbidden, and the transitions between the levels 1 and 2 and between the levels 2 and 3 are allowed.

The $^5S_2$ (Y3) level was chosen as the level 4 for pumping electrons from the level 3 to level 2. Since the symmetry of the $^5S_2$ (Y3) level is $\Gamma_1$, the $^5I_8$ (X1)→$^5S_2$ (Y3) transition becomes allowed from the selection rule. The electrons excited to the $^5S_2$ (Y3) level emit phonons and quickly relaxes to the $^5S_2$ (Y1) level.

Therefore, by conducting electron excitation at the $^5S_2$ (Y3) level, population can be formed at the $^5S_2$ (Y1) level.

As to the configuration of the resonator, the mirrors 2, 3 are arranged with the interval of 11 cm as mentioned above so that the $^5S_2$ (Y1)→$^3D_3$ (1)(Z1) transition and the $^5I_8$ (X1)→$^5S_2$ (Y1) transition between the levels 1 and 2 and between the levels 2 and 3 are in phase with the resonance mode.

Whether or not a transition is in phase with the resonance mode can be checked by examining the emission life from the $^3D_3$ (1)(Z1) level to the $^5S_2$ (Y1) level and from the $^5S_2$ (Y1) level to the $^5I_8$ (X1) level. At this time, the $^5I_8$ (X1)→$^3D_3$ (1)(Z1) transition between the levels 1 and 3 is out of phase with the resonance mode.

As to the position of the YAG crystal in the resonator, the configuration is as mentioned below.

From the selection rule, both the $^5S_2$ (Y1)→$^3D_3$ (1)(Z1) transition and the $^5I_8$ (X1)→$^5S_2$ (Y1) transition between the level 1 and 2 and between the level 2 and 3 behave as the $\pi$ transition with respect to the twofold axis in a crystal (such as the [110] axis, the [101] axis, the [011] axis). Accordingly, the YAG crystal is arranged so that the [110] axis is parallel to the resonator axis.

Accordingly, in the LWI laser, electrons are light-pumped from the $^5I_8$ (X1) level to the $^5S_2$ (Y1) level while light-exciting between the $^5S_2$ (Y1) and $^3D_3$ (1)(Z1) levels.

A light energy $\omega_1$ of the controlling light, which corresponds with the $^5S_2$ (Y1)→$^3D_3$ (1)(Z1) transition between the level 2 and 3, was chosen. And a photon energy of the pumping light, which corresponds with the $^5I_8$ (X1)→$^5S_2$ (Y3) transition between the level 2 and 4, was chosen. The intensity of the controlling light was set to be 0.1 W, and the intensity of the pumping light to enter the EIT layer was set to be 1 W.

Based on the above-mentioned element configuration, the existence of the laser oscillation from the $^5S_2$ (Y1)$^3$ level to the $^5I_8$ (X1) level was examined. As a result, continuous oscillation of a laser light was observed in the vicinity of the frequency 18450 cm$^{-1}$ corresponding to the $^5S_2$ (Y1)→$^5I_8$ (X1) transition. The intensity was about 0.4 mW.

A configuration with the distance between the mirrors 11 cm changed will be explained.

With the LWI laser of the same configuration as the fourth embodiment except that the $^5S_2$ (Y1)→$^3D_3$ (1)(Z1) transition between the level 1 and 2 was out of phase with the resonance mode by changing the distance between the mirrors, the existence of the laser oscillation from the $^5S_2$ (Y1) level to the $^5I_8$ (X1) level was examined. As a result, in this comparative embodiment, the laser oscillation was not observed.

The fifth embodiment of the present invention will be explained.

The fifth embodiment is more specific compared with the LWI laser shown in FIG. 5. That is, in this embodiment, the EIT layer comprises CaF$_2$ where Sm$^{2+}$ is dispersed as an impurity, both the controlling light source 4 and the pumping light source 5 comprise a semiconductor laser, and the photodiode 6 comprises an Si photodiode. In the fourth embodiment, the mirrors 2, 3 are arranged with the interval of 9 cm.

Figure 11:
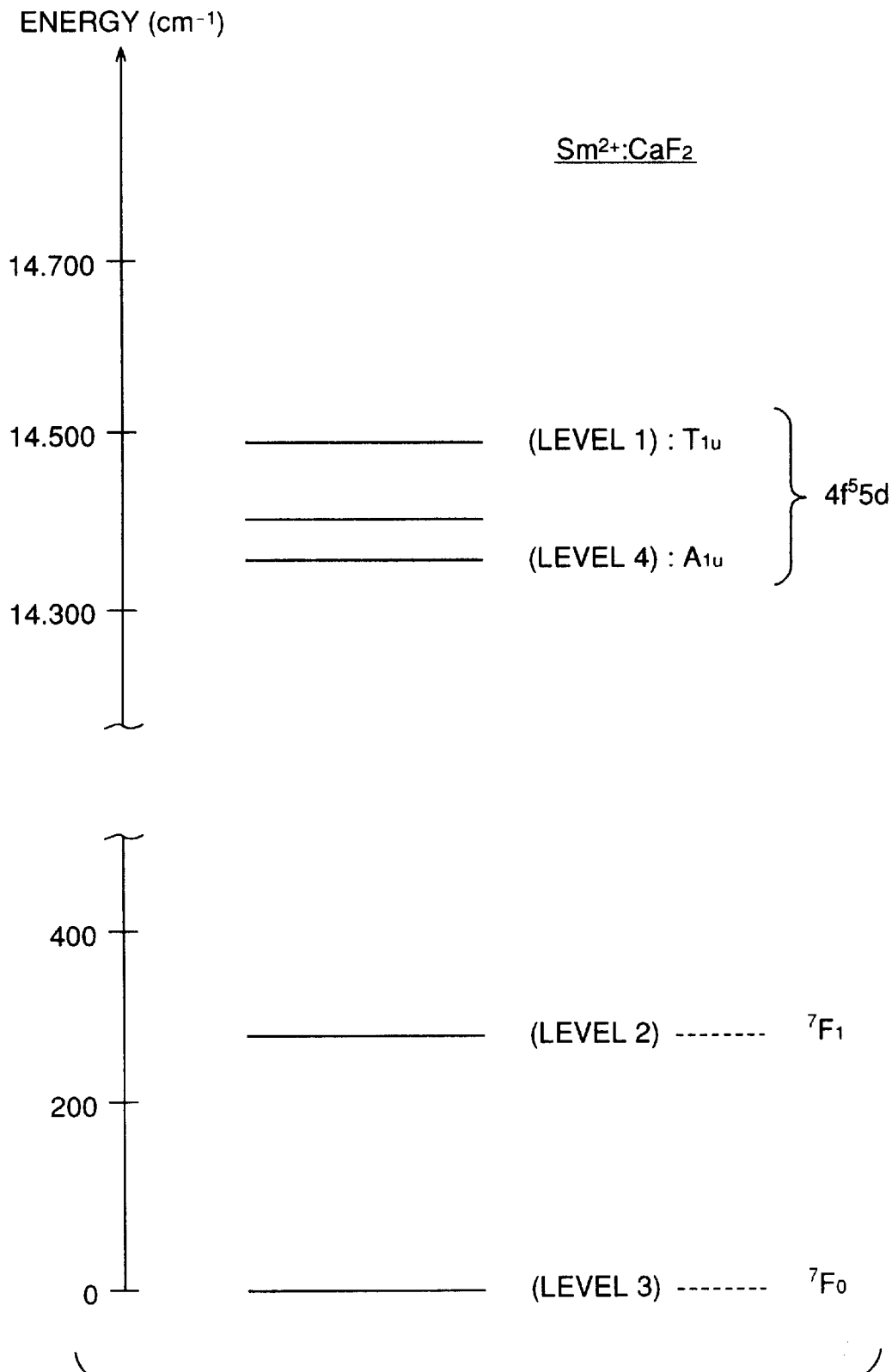
FIG. 11 is a diagram showing the energy levels of $Sm^{2+}$ in $Sm^{2+};CaF_2$ used as the EIT layer in the LWI laser of the fifth embodiment of the present invention.

Impurity levels of Sm$^{2+}$ in CaF$_2$ was used as the three energy levels. As shown in FIG. 11, the $T_{1u}$ level of the electron configuration (f)$^5$ (d) was selected as the uppermost level 1, the $^7F_1$ level of the electron configuration (f)$^6$ was selected as the middle level 2, and the $^7F_0$ level of the electron configuration (f)$^6$, which was the ground state, was selected as the lowest level 3. As to the symmetry of each level, the $T_{1u}$ level was $T_{1u}$, the $^7F_1$ level was $T_{1g}$, and the $^7F_0$ level was $A_{1g}$.

Accordingly, the $^7F_1 \rightarrow T_{1u}$ transition between the level 1 and 2 is the $T_{1g} \rightarrow T_{1u}$ transition, the $^7F_0 \rightarrow T_{1u}$ transition between the level 1 and 3 is the $A_{1g} \rightarrow T_{1u}$ transition, and the $7F_0 \rightarrow ^7F_1$ transition between the level 2 and 3 is $A_{1g} \rightarrow T_{1g}$ transition. As to the selection rule of the optical transition concerning the electric dipole transition, the transitions between the level 1 and 2 and between the level 1 and 3 are allowed, and the transition between the level 2 and 3 is forbidden.

The $A_{1u}$ transition of the electron configuration (f)$^5$(d) was chosen as the level 4 for pumping electrons from the level 3 to level 2. The electrons excited to the $A_{1u}$ level quickly relaxes to the $^7F_1$ level.

Therefore, by conducting electron excitation from the $^7F_0$ level to the $A_{1u}$ level, population can be formed at the $^7F_1$ level.

As to the configuration of the resonator, the mirrors 2, 3 are arranged with the interval of 9 cm as mentioned above so that the $^7F_1 \rightarrow T_{1u}$ transition and the $^7F_0 \rightarrow T_{1u}$ transition between the level 1 and 2 and between the level 1 and 3 are in phase with the resonance mode. At this time, the $^7F_0 \rightarrow ^7F_1$ transition between the level 2 and 3 is out of phase with the resonance mode.

Accordingly, in the LWI laser, electrons are light-pumped from the $^7F_0$ level to the $^7F_1$ level while light-exciting between the $^7F_1$ and $T_{1u}$ levels. A light energy $\omega_1$ of the controlling light, which corresponds with the $^7F_1 \rightarrow T_{1u}$ transition between the level 1 and 2, was chosen. And a photon energy of the pumping light, which corresponds with the $^7F_0 \rightarrow A_{1u}$ transition between the level 3 and 4, was chosen. The intensity of the controlling light was set to be 0.1 W, and the intensity of the pumping light to enter the EIT layer was set to be 1 W.

Based on the above-mentioned element configuration, the existence of the laser oscillation from the $T_{1u}$ level to the $^7F_0$ level was examined. As a result, continuous oscillation of a laser light was observed in the vicinity of the frequency 14483 cm$^{-1}$ corresponding to the $T_{1u} \rightarrow ^7F_0$ transition. The intensity was about 0.09 mW.

The sixth embodiment of the present invention will be explained.

The sixth embodiment is more specific compared with the LWI laser shown in FIG. 5. That is, in this embodiment, the EIT layer comprises CaF$_2$ where Tm$^{2+}$ is dispersed as an impurity, both the controlling light source 4 and the pumping light source 5 comprise a semiconductor laser, and the photodiode 6 comprises an Si photodiode. In the fourth embodiment, the mirrors 2, 3 are arranged with the interval of 10 cm.

Figure 12:
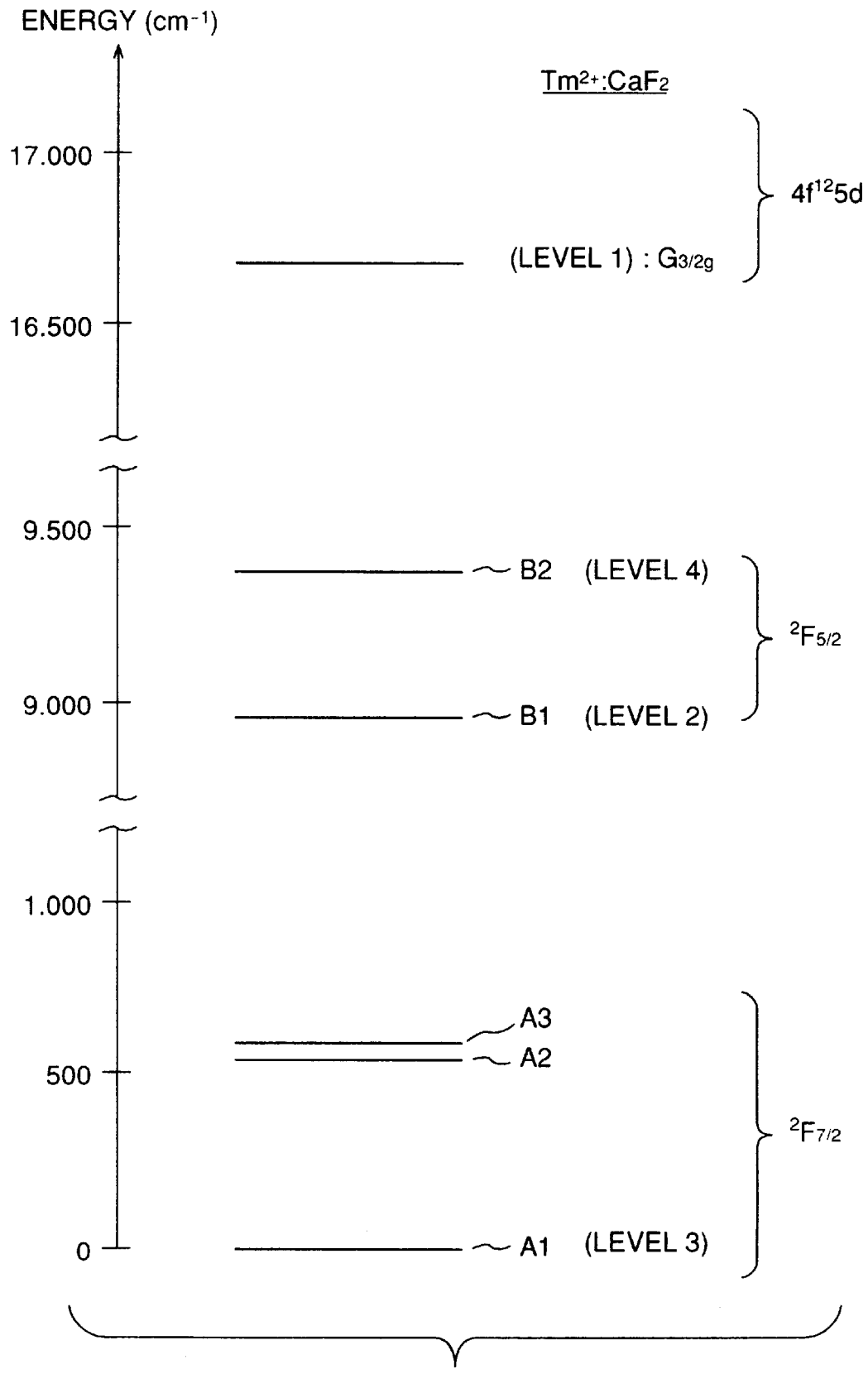
FIG. 12 is a diagram showing the energy levels of $Tm^{2+}$ in $Tm^{2+};CaF_2$ used as the EIT layer in the LWI laser of the sixth embodiment of the present invention.

Impurity levels of Tm$^{2+}$ in CaF$_2$ was used as the three energy levels. As shown in FIG. 12, the $G_{3/2g}$ level of the electron configuration (f)$^{12}$ (d) was selected as the uppermost level 1, the B1level split in the crystal field among the $^2F_{5/2}$ level of the electron configuration (f)$^{13}$ was selected as the middle level 2, and the A1level split in the crystal field among the $^2F_{7/2}$ level of the electron configuration (f)$^{13}$, which was the ground state, was selected as the lowest level 3. As to the symmetry of each level, the $G_{3/2}$ was $G_{3/2}$, the $^2F_{5/2}$(B1) level is $E_{5/2u}$, and the $^2F_{7/2}$ (A1) level was $E_{5/2u}$.

Accordingly, the $^2F_{5/2}$ (B1)→$G_{3/2g}$ transition between the level 1 and 2 and the $^2F_{7/2}$ (A1)→$G_{3/2g}$ transition between the level 1 and 3 are $E_{5/2u}$→$G_{3/2g}$ transition, and the $^2F_{7/2}$ (A1)→$^2F_{5/2}$ (B1) transition between the level 2 and 3 is $E_{5/2u}$→$E_{5/2u}$ transition. As to the selection rule of the optical transition concerning the electric dipole transition, the transitions between the level 1 and 2 and between the levels 1 and 3 are allowed, and the transition between the level 2 and 3 is forbidden.

The $^2F_{5/2}$ (B2) level of the electron configuration $(f)^{13}$ was chosen as the level 4 for pumping electrons from the level 3 to level 2. The electrons excited to the $^2F_{5/2}$ (B2) level quickly relaxes to the $^2F_{5/2}$ (B1) level.

Therefore, by conducting electron excitation from the $^2F_{7/2}$ (A1) level to the $^2F_{5/2}$ (B2) level, population can be formed at the $^2F_{5/2}$ (B1) level.

As to the configuration of the resonator, the mirrors 2, 3 are arranged with the interval of 10 cm as mentioned above so that the $^2F_{5/2}$ (B1)→$G_{3/2g}$ transition and the $^2F_{7/2}$ (A1)→$G_{3/2g}$ transition between the levels 1 and 2 and between the level 1 and 3 are in phase with the resonance mode. At this time, the $^2F_{7/2}$ (A1)→$^2F_{5/2}$ (B2) transition between the level 2 and 3 is out of phase with the resonance mode.

Accordingly, in the LWI laser, electrons are light-pumped from the $^2F_{7/2}$ (A1) level to the $^2F_{5/2}$ (B2) level while light-exciting between the $^2F_{5/2}$ (B1) and $G_{3/2g}$ levels.

A light energy $\omega_1$ of the controlling light, which corresponds with the $^2F_{5/2}$ (B1)→$G_{3/2g}$ transition between the level 1 and 2, was chosen. And a photon energy of the pumping light, which corresponds with the $^2F_{7/2}$ (A1)→$^2F_{5/2}$ (B2) transition between the level 3 and 4, was chosen. The intensity of the controlling light was set to be 0.1 W, and the intensity of the pumping light to enter the EIT layer was set to be 1 W.

Based on the above-mentioned element configuration, the existence of the laser oscillation from the $G_{3/2g}$ level to the $^2F_{7/2}$ (A1) level was examined. As a result, continuous oscillation of a laser light was observed in the vicinity of the angular frequency 16675 cm$^{-1}$ corresponding to the $G_{3/2g}$→$^2F_{7/2}$ (A1) transition. The intensity was about 0.05 mW.

The seventh embodiment of the present invention will be explained.

Figure 13:
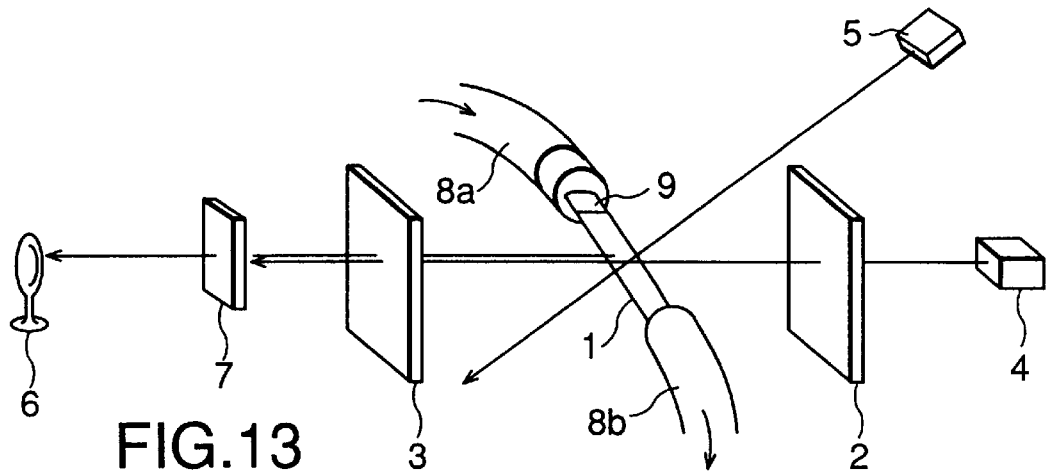
FIG. 13 is a diagram showing the schematic configuration of the LWI laser of the seventh embodiment of the present invention.

FIG. 13 is a diagram showing the schematic configuration of the LWI laser of the seventh embodiment of the present invention.

In the seventh embodiment, the EIT medium comprises a liquid comprising PrCl$_3$ dissolved in a polarized solvent. Unlike the laser shown in FIG. 5, the LWI laser shown in FIG. 13 comprises a mechanism for arranging the liquid shape like a plate by jetting the EIT medium from a nozzle 9 by applying pressure. Since the other configurations including the controlling light source 4, the pumping light source 5, and the photodiode 6, are the same as those of the above-mentioned embodiment, detailed explanation is not provided herein.

Figure 14:
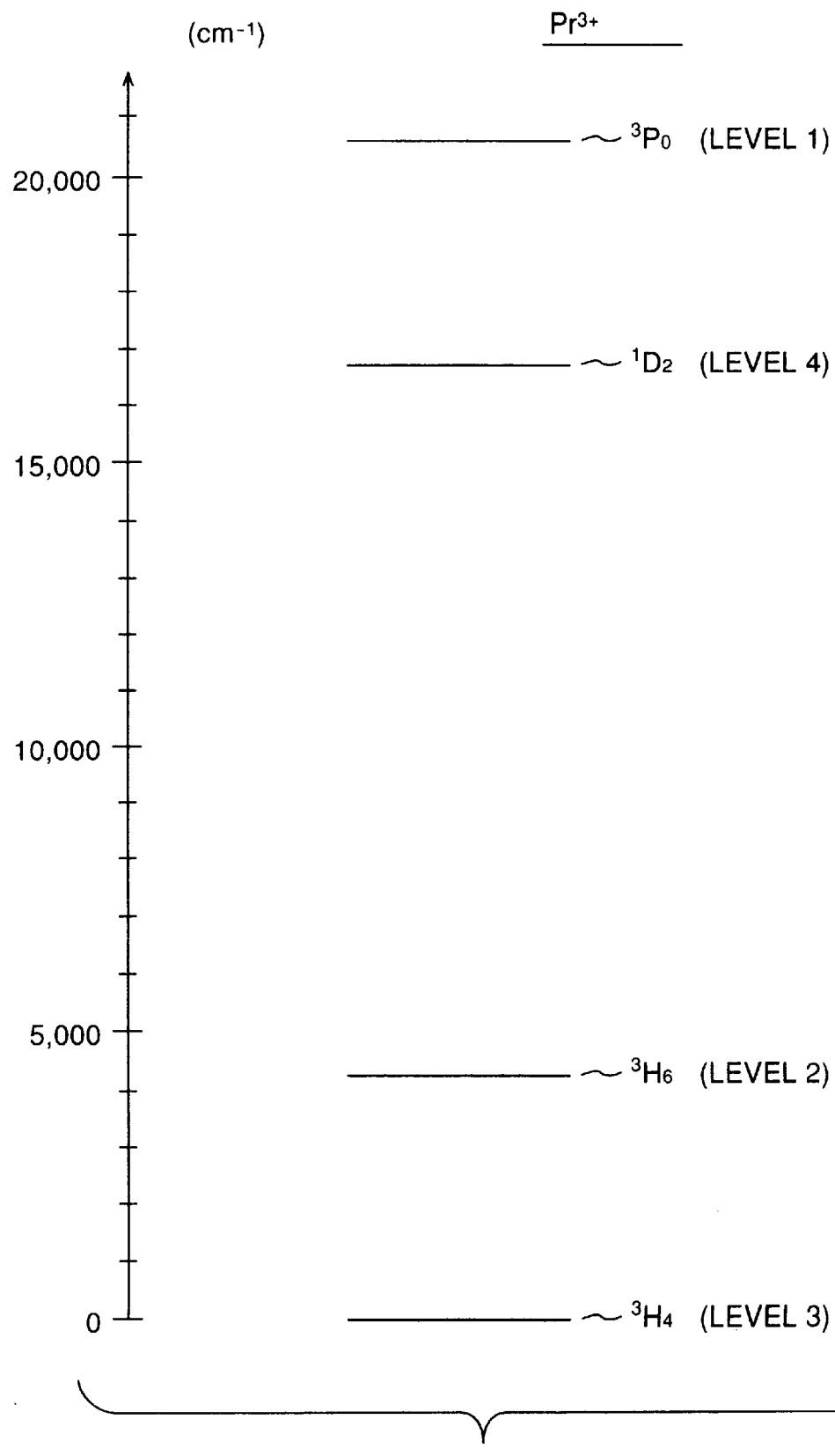
FIG. 14 is a diagram showing the energy levels of $PrCl_3$ used as the EIT layer in the LWI laser of the seventh embodiment of the present invention.

The 4f level in Pr$^{3+}$ was used as the three energy levels. As shown in FIG. 14, the $^3H_0$ level was selected as the uppermost level 1, the $^3H_6$ level was selected as the middle level 2, and the $^3H_4$ level, which was the ground state, was selected as the lowest level 3.

The $^1D_2$ level was chosen as the level 4 for pumping electrons from the level 3 to level 2. The electrons excited to the $^1D_2$ level quickly relaxes to the $^3H_6$ level. Therefore, by conducting electron excitation from the $^3H_4$ level to the $^1D_2$ level, population can be formed at the $^3H_6$.

As to the configuration of the resonator, the mirrors 2, 3 are arranged with the interval of 12 cm as mentioned above so that the $^3H_4$→$^3P_0$ transition and the $^3H_6$→$^3P_0$ transition between the level 1 and 2 and between the level 1 and 3 are in phase with the resonance mode. At this time, the $^3H_4$→$^3H_6$ transition between the level 2 and 3 is out of phase with the resonance mode.

Accordingly, in the LWI laser, electrons are light-pumped from the $^3H_4$ level to the $^1D_2$ level while light-exciting between the $^3H_6$ and $^3P_0$ levels. A photon energy $\omega_1$ of the controlling light, which corresponds with the $^3H_6$→$^3P_0$ transition between the level 1 and 2, was chosen. And a photon energy of the pumping light, which corresponds with the $^3H_4$→$^1D_2$ transition between the level 3 and 4, was chosen. The intensity of the controlling light was set to be 0.1 W, and the intensity of the pumping light to enter the EIT layer was set to be 1 W.

Based on the above-mentioned element configuration, the existence of the laser oscillation from the $^3P_0$ level to the $^3H_4$ level was examined. As a result, continuous oscillation of a laser light was observed in the vicinity of the angular frequency 20551 cm$^{-1}$ corresponding to the $^3P_0$→$^3H_4$ transition. The intensity was about 0.03 mW.

As heretofore mentioned, in this invention, the system is arranged so that the energy between the levels coupled by light can coincide with the resonance mode of a resonator, and the levels not coupled by light can be out of the resonance mode even in the case values of the transition probability of the light transition of the impurity in the medium or the relaxation rate do not coincide with the EIT conditions. Accordingly, the EIT can be induced in substantially all impurities to realize a practical function element such as an LWI laser based on the EIT in a medium such as a solid.

Effects of the present invention will be explained in detail along with two EIT conditions.

Figure 15A:
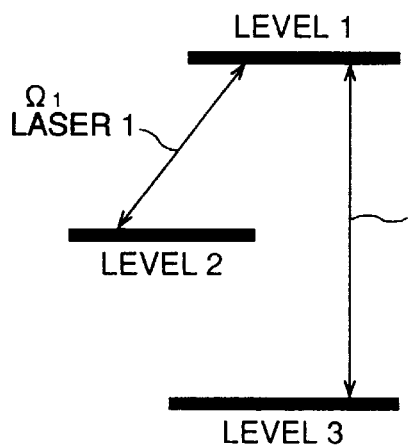
FIGS. 15A to 15C are diagrams showing the basic principles for explaining the effects of the present invention.
Figure 15B:
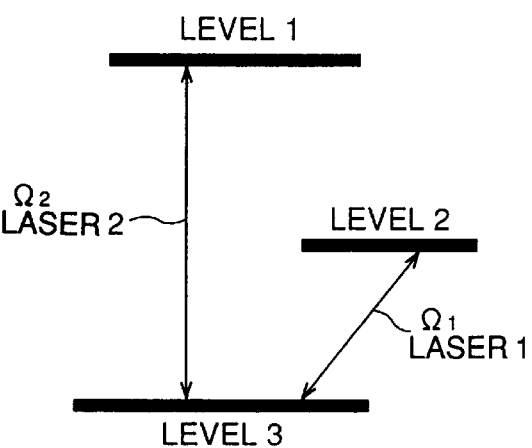
Figure 15C:
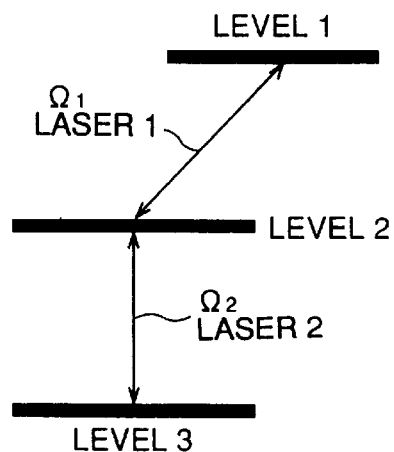

A system to be the subject herein basically comprises three levels and two coherent lights 1, 2. Three schemes exist for the combination of the levels 1, 2 and the lights. As shown in FIG. 15A, the excitation with the two excited lights 1, 2 with the uppermost level 1 as the common level is defined to be the Λ type excitation. As shown in FIG. 15B, the excitation with the ground state 3 as the common level is defined to be the V type excitation. And as shown in FIG. 15C, the excitation with the middle level 2 as the common level is defined to be the Ξ type excitation.

The case of the Λ type excitation of three levels will be discussed. In order to induce the EIT in the system, it is required to have the level 2 and 3, not conducting the optical excitation, optically forbidden therebetween with the relaxation rate extremely smaller with respect to the relaxation rates between the levels 1 and 2 and between the level 1 and 3, which are the allowed transitions. This is one of two conditions to be satisfied in order to induce the EIT, and is known as the EIT condition on the transition probability and the relaxation.

Accordingly, the conditions on the above-mentioned transition probability are realized in the present invention by having transitions between the level 1 and 2 and between the level 1 and 3 in phase with the resonance mode of the resonator, but having the transition between the level 2 and 3 out of phase in the Λ type excitation, having transitions between the level 1 and 3 and between the level 2 and 3 in phase with the resonance mode of the resonator, but having the transition between the level 1 and 2 out of phase in the V type excitation, and having transitions between the level 1 and 2 and between the level 2 and 3 in phase with the resonance mode of the resonator, but having the transition between the level 1 and 3 out of phase in the Ξ type excitation.

Figure 16A:
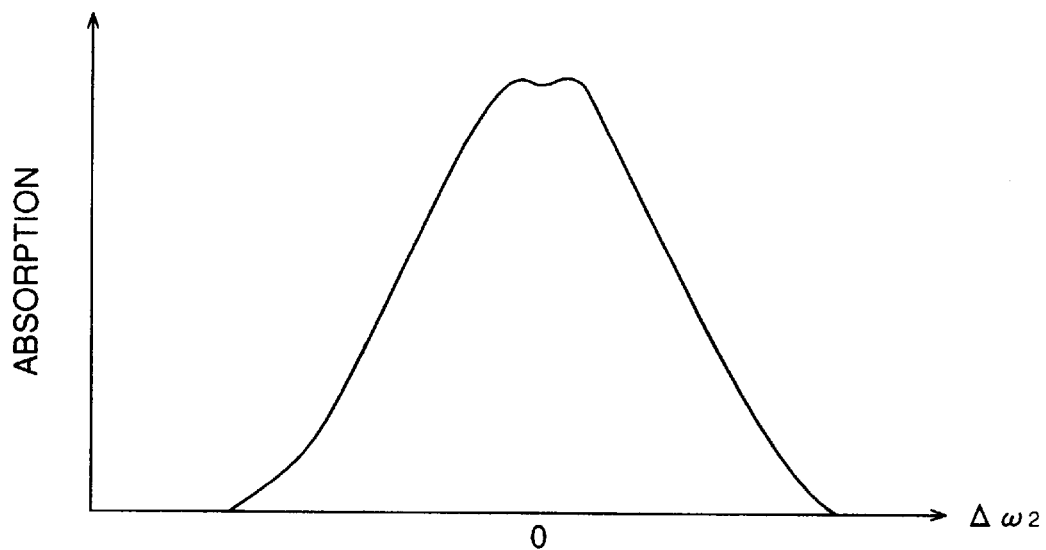
FIGS. 16A and 16B are graphs showing the light absorption spectrum by the EIT for explaining the effects of the present invention.
Figure 16B:
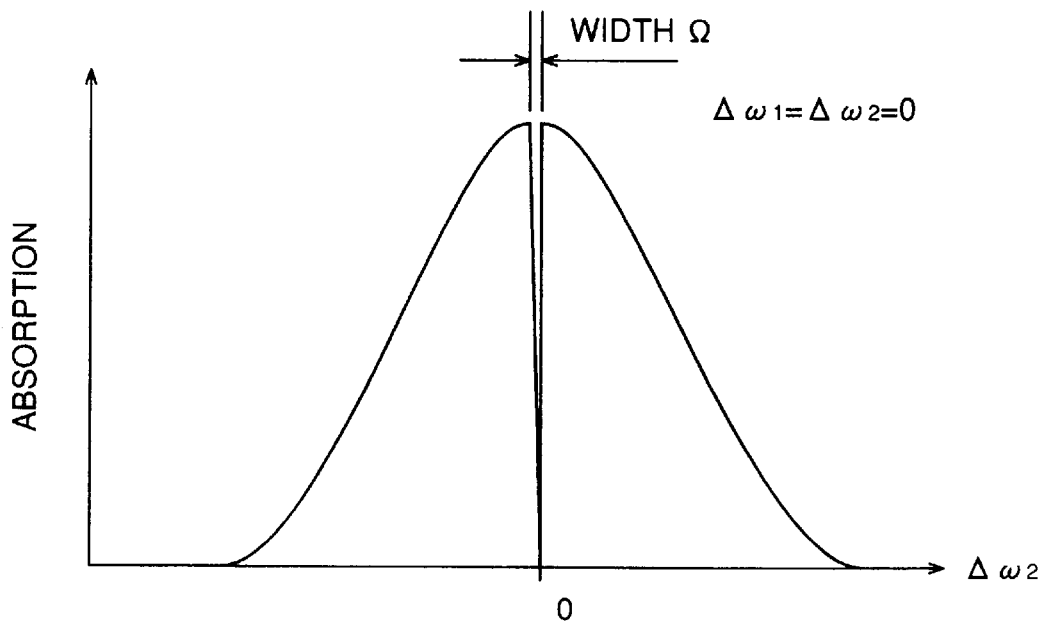

As shown in FIG. 16B, an absorption hole, that is, a transparent area exists in the spectrum at $\Delta\omega_2=0$ $(=\Delta\omega_1)$, which is considered to show a single absorption peak. $\Delta\omega_1=\Delta\omega_2$ is the second EIT condition, that is, the EIT condition on detuning.

The width of the hole $\Omega$ at the time is described as $\Omega \sim (\Omega_{12}^2+\Omega_{13}^2)^{1/2}$, where $\Omega_{12}$ and $\Omega_{13}$ represent two Rabi-frequencies of the lights 1, 2. Further, the two Rabi-frequencies $\Omega_{12}$, $\Omega_{13}$ are the amounts of a light intensity defined by $\Omega_{12}=2\pi\mu_{12}E_{12}/h$, and $\Omega_{13}=2\pi\mu_{13}E_{13}/h$, where $\mu_{12}$, $\mu_{13}$ represent the electric dipole moments between the level 1 and 2, and between the level 1 and 2, $E_{12}$, $E_{13}$ represent the electric field intensities of the lights 1 and 2, and h represents the Planck's constant.

In the case the second condition is not satisfied, the transparent area does not exist as shown in FIG. 16A.

The LWI based on the EIT will be discussed. A circumstance where coherent lights 1, 2 incident on a system satisfy the EIT condition; $\Delta\omega_1=\Delta\omega_2$ and a transparent area is formed in the absorption spectrum from the level 3 to the level 1.

If an incoherent light 3 including the transition energy between the level 1 and 3 is irradiated, the light 3 is absorbed by the system. Intuitively this is because the interference effect of the EIT does not function to an incoherent light so that it does not become transparent from the level 3 to the level 1. Electrons excited from the level 3 to the level 1 by the light 3 fall again to the level 3 as an coherent light by the stimulated emission.

That is, even in the transition between the levels 1 and 3, an incoherent light is absorbed in the transparent area generated by the EIT so that asymmetry property of the absorption and emission where an emitting coherent light is not absorbed generates.

Accordingly, the coherent light 2 is amplified by the incoherent light 3. Such a phenomenon occurs also in the case the sum of the populations of the levels 1, 2 in the excited state is smaller than the population of the level 3 in the ground state, that is, without the population inversion, and thus it can be applied as a new principle of the laser oscillation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An optical device comprising:
    a medium containing an impurity,
        having a first level, a second level and a third level in descending order of energy levels,
        and having first inherent transition probability between said first level and said second level, a second inherent transition probability between said first level and said third level and a third inherent transition probability between said second level and said third level;
    a resonator having a pair of mirrors arranged so as to interpose said medium, and having a plurality of resonant frequencies, a frequency of a first optical transition between said first level and said second level coinciding with one of said resonant frequencies of said resonator, a frequency of a second optical transition between said first level and said third level coinciding with one of said resonant frequencies of said resonator, a frequency of a third optical transition between said second level and said third level being out of phase with frequencies of said resonator; and
    an inputting means for a first coherent light having a wavelength essentially corresponding to said first optical transition and a second coherent light having a wavelength essentially corresponding to said second optical transition,
    wherein a transition probability of said first optical transition is higher than said first inherent transition probability,
    a transition probability of said second optical transition is higher than said second inherent transition probability,
    a transition probability of said third optical transition is lower than said third inherent transition probability,
    and said medium outputs a coherent output light having a wavelength essentially corresponding to said second coherent light.

2. The optical device according to claim 1, wherein each of the first optical transition and the second optical transition is a $\sigma$ transition, and said medium comprises a crystal and is arranged so that a transition probability becomes maximum in a direction perpendicular to surfaces of the pair of mirrors.

3. The optical device according to claim 1, wherein each of the first optical transition and the second transition is a $\pi$ transition, and the medium comprises a crystal and is arranged so that a transition probability becomes minimum in a direction parallel to surfaces of the pair of mirrors.

4. The optical device according to claim 1, wherein at least one of $(n_{23}/n_{12})$ or $(n_{23}/n_{13})$ is not an integer, where $n_{12}$ represents a refractive index of said medium with respect to a light having an angular frequency corresponding to the energy between the first level and the second level, $n_{13}$ represents a refractive index of said medium with respect to a light having an angular frequency corresponding to the energy between the first level and the third level, and $n_{23}$ represents a refractive index of said medium with respect to a light having an angular frequency corresponding to the energy between the second level and the third level.

5. The optical device according to claim 1, further comprising:
    pumping light means for pumping electrons of the third level to the first level
    or said second level,
    wherein said coherent output light is amplified based on inputted said second coherent light.

6. An optical device comprising:
    a medium containing an impurity,
    having a first level, a second level and a third level in descending order of energy levels,
    and having a first inherent transition probability between said first level and said second level, a second inherent transition probability between said first level and said third level and a third inherent transition probability between said second level and said third level;
    a resonator having a pair of mirrors arranged so as to interpose said medium,
    and having a plurality of resonant frequencies, a frequency of a first optical transition between said first level and said second level coinciding with one of said resonant frequencies of said resonator, a frequency of a second optical transition between said first level and said third level coinciding with one of said resonant frequencies of said resonator, a frequency of a third optical transition between said second level and said third level being out of phase with frequencies of said resonator; and a first coherent light having a wavelength essentially corresponding to said first optical transition; and pumping light for pumping electrons to said first level or said second level, wherein a transition probability of said first optical transition is higher than said first inherent transition probability, a transition probability of said second optical transition is higher than said second inherent transition probability, a transition probability of said third optical transition is lower than said third inherent transition probability, and said medium outputs a coherent output light having a wavelength essentially corresponding to said second optical transition, and said coherent output light is a laser light.

7. An optical device comprising:

a medium containing an impurity, having a first level, a second level and a third level in descending order of energy levels, and having first inherent transition probability between said first level and said second level, a second inherent transition probability between said first level and said third level and a third inherent transition probability between said second level and said third level;

a resonator having a pair of mirrors arranged so as to interpose said medium and having a plurality of resonant frequencies, a frequency of a first optical transition between the first level and the third level coinciding with one of the resonant frequencies of said resonator, and a frequency of a second optical transition between the second level and the third level coinciding with another one of the resonant frequencies of said resonator, a frequency of a third optical transition between the first level and the second level being out of phase with the resonant frequency of said resonator; and an inputting means for a first coherent light having a wavelength essentially corresponding to said first optical transition and a second coherent light having a wavelength essentially corresponding to said second optical transition, wherein a transition probability of said first optical transition is higher than said first inherent transition probability, a transition probability of said second optical transition is higher than said second inherent transition probability, a transition probability of said third optical transition is lower than said third inherent transition probability, and said medium outputs a coherent output light having a wavelength essentially corresponding to said second coherent light.

8. The optical device according to claim 7, wherein each of the first optical transition and the second transition is a σ transition, and said medium comprises a crystal and is arranged so that a transition probability becomes maximum in a direction perpendicular to surfaces of the pair of mirrors.

9. The optical device according to claim 7, wherein each of the first optical transition and the second transition is a π transition, and said medium comprises a crystal and is arranged so that a transition probability becomes minimum in a direction parallel to surfaces of the pair of mirrors.

10. The optical device according to claim 7, wherein at least one of $(n_{12}/n_{13})$ or $(n_{12}/n_{23})$ is not an integer, where $n_{12}$ represents a refractive index of said medium with respect to a light having an angular frequency corresponding to the energy between the first level and the second level, $n_{13}$ represents a refractive index of said medium with respect to a light having an angular frequency corresponding to the energy between the first level and the third level, and $n_{23}$ represents a refractive index of said medium with respect to a light having an angular frequency corresponding to the energy between the second level and the third level.

11. The optical device according to claim 7, further comprising:

pumping light means for pumping electrons of the second level to the first level wherein said coherent output light is amplified based on inputted said second coherent light.

12. An optical device comprising:

a medium containing an impurity, having a first level, a second level and a third level in descending order of energy levels, and having a first inherent transition probability between said first level and said second level, a second inherent transition probability between said first level and said third level and a third inherent transition probability between said second level and said third level;

a resonator having a pair of mirrors arranged so as to interpose said medium, and having a plurality of resonant frequencies, a frequency of a first optical transition between said first level and said second level coinciding with one of said resonant frequencies of said resonator, a frequency of a second optical transition between said first level and said third level coinciding with one of said resonant frequencies of said resonator, a frequency of a third optical transition between said second level and said third level being out of phase with frequencies of said resonator; and a first coherent light having a wavelength essentially corresponding to said first optical transition; and pumping light for pumping electrons to said first level or said second level, wherein a transition probability of said first optical transition is higher than said first inherent transition probability, a transition probability of said second optical transition is higher than said second inherent transition probability, a transition probability of said third optical transition is lower than said third inherent transition probability, and said medium outputs a coherent output light having a wavelength essentially corresponding to said first optical transition, and said coherent output light is a laser light.

13. An optical device comprising:

a medium containing an impurity, having a first level, a second level and a third level in descending order of energy levels, and having first inherent transition probability between said first level and said second level, a second inherent transition probability between said first level and said third level and a third inherent transition probability between said second level and said third level;

a resonator having a pair of mirrors arranged so as to interpose said medium and having a plurality of resonant frequencies, a frequency of a first optical transition between the first level and the second level coinciding with one of the resonant frequencies of said resonator, and a frequency of a second optical transition between the second level and the third level coinciding with another one of the resonant frequencies of said resonator, a frequency of a third optical transition between the first level and the third level being out of phase with the resonant frequency of said resonator; and an inputting means for a first coherent light having a wavelength essentially corresponding to said first optical transition and a second coherent light having a wavelength essentially corresponding to said second optical transition, wherein a transition probability of said first optical transition is higher than said first inherent transition probability, a transition probability of said second optical transition is higher than said second inherent transition probability, a transition probability of said third optical transition is lower than said third inherent transition probability, and said medium outputs a coherent output light having a wavelength essentially corresponding to said second coherent light.

14. The optical device according to claim 13, wherein each of the first optical transition and the second transition is a σ transition, and said medium comprises a crystal and is arranged so that a transition probability becomes maximum in a direction perpendicular to surfaces of the pair of mirrors.

15. The optical device according to claim 13, wherein each of the first optical transition and the second transition is a π transition, and said medium comprises a crystal and is arranged so that a transition probability becomes minimum in a direction parallel to surfaces of the pair of mirrors.

16. The optical device according to claim 13, wherein at least one of $(n_{13}/n_{12})$ or $(n_{13}/n_{23})$ is not an integer, where $n_{12}$ represents a refractive index of said medium with respect to a light having an angular frequency corresponding to the energy between the first level and the second level, $n_{13}$ represents a refractive index of said medium with respect to a light having an angular frequency corresponding to the energy between the first level and the third level, and $n_{23}$ represents a refractive index of said medium with respect to a light having an angular frequency corresponding to the energy between the second level and the third level.

17. The optical device according to claim 13, further comprising:

pumping light means for pumping electrons of the third level to the second level wherein said coherent output light is amplified based on inputted said second coherent light.

18. An optical device comprising:

a medium containing an impurity, having a first level, a second level and a third level in descending order of energy levels, and having a first inherent transition probability between said first level and said second level, a second inherent transition probability between said first level and said third level and a third inherent transition probability between said second level and said third level;

a resonator having a pair of mirrors arranged so as to interpose said medium, and having a plurality of resonant frequencies, a frequency of a first optical transition between said first level and said second level coinciding with one of said resonant frequencies of said resonator, a frequency of a second optical transition between said first level and said third level coinciding with one of said resonant frequencies of said resonator, a frequency of a third optical transition between said second level and said third level being out of phase with frequencies of said resonator; and a first coherent light having a wavelength essentially corresponding to said first optical transition; and pumping light for pumping electrons to said first level or said second level, wherein a transition probability of said first optical transition is higher than said first inherent transition probability, a transition probability of said second optical transition is higher than said second inherent transition probability, a transition probability of said third optical transition is lower than said third inherent transition probability, and said medium outputs a coherent output light having a wavelength essentially corresponding to said third optical transition, and said coherent output light is a laser light.

* * * * *

UNITED STATES PATENT AND TRADEMARK OFFICE
CERTIFICATE OF CORRECTION

PATENT NO. : 6,028,873
DATED : February 22, 3000
INVENTORS : Kazushige YAMAMOTO et al It is certified that error appears in the above-identified patent and that said Letters Patent is hereby corrected as shown below:

Claim 10, Column 28, line 2, "$(n_{12}/n_{13'})$" should read --$(n_{12}/n_{13})$--.

Signed and Sealed this

Twenty-fourth Day of April, 2001

Attest:

Attesting Officer

NICHOLAS P. GODICI

*Acting Director of the United States Patent and Trademark Office*